US009857749B2

(12) United States Patent
Ochi

(10) Patent No.: US 9,857,749 B2
(45) Date of Patent: Jan. 2, 2018

(54) DRIVING FORCE TRANSMISSION APPARATUS, SHEET CONVEYANCE APPARATUS, AND IMAGE FORMING APPARATUS

(71) Applicant: CANON KABUSHIKI KAISHA, Tokyo (JP)

(72) Inventor: Junichi Ochi, Mishima (JP)

(73) Assignee: Canon Kabushiki Kaisha, Tokyo (JP)

( * ) Notice: Subject to any disclaimer, the term of this patent is extended or adjusted under 35 U.S.C. 154(b) by 140 days.

(21) Appl. No.: 14/688,143

(22) Filed: Apr. 16, 2015

(65) Prior Publication Data

US 2015/0301492 A1 Oct. 22, 2015

(30) Foreign Application Priority Data

Apr. 22, 2014 (JP) ................................ 2014-088231
Apr. 6, 2015 (JP) ................................ 2015-077792

(51) Int. Cl.

*F16H 3/44* (2006.01)
*G03G 15/00* (2006.01)
*B65H 5/06* (2006.01)
*B65H 85/00* (2006.01)

(52) U.S. Cl.

CPC ........... *G03G 15/6529* (2013.01); *B65H 5/06* (2013.01); *B65H 85/00* (2013.01); *B65H 2403/481* (2013.01); *B65H 2601/324* (2013.01); *B65H 2801/06* (2013.01); *G03G 15/6573* (2013.01); *G03G 2215/00679* (2013.01)

(58) Field of Classification Search

CPC .......... B65H 2301/16; B65H 2301/332; B65H 2301/333; B65H 2301/4211; B65H 2404/651; B65H 29/58; B65H 29/60; B65H 31/00; B65H 2301/33; B65H 2403/22; B65H 2403/481; B65H 2403/51; B65H 2403/53; B65H 2403/722; B65H 2403/725; F16H 2200/2033

USPC .................................... 271/186, 65; 475/311

See application file for complete search history.

(56) References Cited

U.S. PATENT DOCUMENTS 5,585,898 A * 12/1996 Fujii ................. G03G 15/0126 399/228
8,646,776 B2 2/2014 Agata et al.
2011/0156336 A1* 6/2011 Agata ................... B65H 5/062 271/3.19

FOREIGN PATENT DOCUMENTS

JP 2000-281226 A 10/2000
JP 2003-212370 A 7/2003
JP 2009-073648 A 4/2009

(Continued)

*Primary Examiner* — Thomas Morrison

(74) *Attorney, Agent, or Firm* — Fitzpatrick, Cella, Harper & Scinto

(57) ABSTRACT

The conveyance apparatus includes a first engaging portion of a first planetary gear unit and a second engaging portion of a second planetary gear unit, and a stopping member movable to a first stop position to stop a first engaged gear, and to a second stop position to stop a second engagement gear, in which a pivot fulcrum of the stopping member is arranged at an intersection between an extension line of a vector of a force that the first engaging portion receives from the first engaged portion under a state in which the stopping member is at the first stop position, and an extension line of a vector of a force that the second engaging portion receives from the second engaged portion under a state in which the stopping member is at the second stop position.

18 Claims, 14 Drawing Sheets

(56) References Cited

FOREIGN PATENT DOCUMENTS

| | | | |
|---|---|---|---|
| JP | 2011-132024 | A | 7/2011 |
| JP | 2011-140980 | A | 7/2011 |
| JP | 2012-078633 | A | 4/2012 |

* cited by examiner

DRIVING FORCE TRANSMISSION APPARATUS, SHEET CONVEYANCE APPARATUS, AND IMAGE FORMING APPARATUS

BACKGROUND OF THE INVENTION

Field of the Invention

The present invention relates to a driving force transmission apparatus, a sheet conveyance apparatus including the driving force transmission apparatus, and to an image forming apparatus including the driving force transmission apparatus.

Description of the Related Art

The image forming apparatus includes a plurality of conveyance rollers configured to convey sheets, and a conveyance roller drive mechanism configured to drive those conveyance rollers. With use of those conveyance rollers, the sheets are conveyed from a sheet receiving cassette or a sheet stacking tray sequentially to an image forming unit configured to form images, and to a sheet delivery tray.

Further, there is given another type of image forming apparatus including a standard or optional conveyance unit configured to convey the sheets with their front and back surfaces being inverted to each other so as to perform duplex printing involving image formation on both a first surface and a second surface of each of the sheets.

In the conveyance unit of various types of apparatus, an operation of switching a forward rotation direction and a reverse rotation direction of the conveyance rollers to each other is performed so that the sheet that has already been subjected to printing on its first surface is switched back and fed into the image forming unit again for printing on its second surface.

In this context, the rotation directions of the conveyance rollers are switched by performing control to switch rotation directions of a motor configured to drive the conveyance rollers, or switched with use of a reverse drive mechanism as disclosed in Japanese Patent Application Laid-Open No. 2011-140980. In the method as disclosed in Japanese Patent Application Laid-Open No. 2011-140980, the image forming apparatus need not include a dedicated motor for the conveyance rollers to be subjected to switching between a forward rotation and a reverse rotation, and hence the image forming apparatus can be relatively inexpensively manufactured.

However, in a conveyance roller drive mechanism used in the image forming apparatus disclosed in Japanese Patent Application Laid-Open No. 2011-140980, as illustrated in FIG. 13 of the present invention, in a pair of planetary gear mechanisms 104 and 105 to be used in combination with each other, only sun gears 100 and 101 including projecting portions need to be formed into different shapes. Specifically, tooth profiles of the projecting portions of the sun gears 100 and 101 of the planetary gear mechanisms are inverted to each other as illustrated in FIG. 13. The reason is as follows.

Specifically, as illustrated in FIG. 13, rotation directions J1 and J2 of the pair of planetary gear mechanisms 104 and 105 are reverse to each other. Distal ends of an engaging arm 102 that is pivotable about a shaft by a solenoid 103 are engaged with the sun gears 100 and 101 of the planetary gear mechanisms. When the distal ends of the engaging arm 102 are selectively engaged with the sun gears in this way, rotation of any one of the planetary gear mechanisms 104 and 105 can be stopped. For this reason, as described above, the tooth profiles of the projecting portions of the sun gears 100 and 101 of the planetary gear mechanisms are inverted to each other.

Thus, the pair of planetary gear mechanisms are not mountable compatibly with each other, and hence operators need to take great care not to make a mistake in assembly of the apparatus. Further, in addition to reduction in assembly work efficiency due to the above-mentioned problem, there are problems of a manufacturing cost for a die set for forming the inverted tooth profiles of the projecting portions of the sun gears as described above, a management cost for components, and the like.

Still further, in a case where the planetary gear mechanisms are further downsized, an interval between the projecting portions inevitably decreases, which leads to a difficulty in arranging the engaging arm.

Yet further, in a case where the projecting portions of the pair of planetary gear mechanisms are formed into the same shape, as illustrated in FIG. 14 of the present invention, the force F in a direction of disengaging an engaging arm 107 is generated in a projecting portion 106 on one side. In order to counteract this push-out force F, for example, a tension spring 108 may be used to apply an urging force to the engaging arm 107. However, in order to switch positions of the engaging arm 107, a driving force greater than a force of the spring needs to be applied. Thus, there may be caused another problem of an upsizing of a switching actuator such as the solenoid.

SUMMARY OF THE INVENTION

In view of the circumstances, it is an object of the present invention to provide a configuration that enables higher assembly work efficiency, or reduction of costs for management and manufacture of components.

Further, it is another object of the present invention to provide a driving force transmission apparatus, including: a first planetary gear unit including: a first engaged gear having a first engaged portion; and a first meshing gear; a second planetary gear unit including: a second engaged gear having a second engaged portion; and a second meshing gear configured to mesh with the first meshing gear; and a stopping member including: a first engaging portion engageable with the first engaged portion; and a second engaging portion engageable with the second engaged portion, the stopping member being pivotally movable to a first stop position at which the first engaging portion is engaged with the first engaged portion so that the first engaged gear is stopped, and to a second stop position at which the second engaging portion is engaged with the second engaged portion so that the second engaged gear is stopped, in which a pivot fulcrum of the stopping member is arranged at an intersection between an extension line of a vector of a force that the first engaging portion receives from the first engaged portion under a state in which the stopping member is at the first stop position, and an extension line of a vector of a force that the second engaging portion receives from the second engaged portion under a state in which the stopping member is at the second stop position.

Further, it is another object of the present invention to provide a driving force transmission apparatus, including: a first planetary gear unit including: a first engaged gear having a first engaged portion; and a first meshing gear; a second planetary gear unit including: a second engaged gear having a second engaged portion; and a second meshing gear configured to mesh with the first meshing gear; and a stopping member including: a first engaging portion engageable with the first engaged portion; and a second engaging portion engageable with the second engaged portion, the stopping member being movable, by pivoting, to a first stop position at which the first engaging portion is engaged with the first engaged portion so that the first engaged gear is stopped, and to a second stop position at which the second engaging portion is engaged with the second engaged portion so that the second engaged gear is stopped, in which a pivot fulcrum of the stopping member is arranged at an intersection between an extension line of a vector in a direction opposite to a vector of a force that the first engaging portion receives from the first engaged portion under a state in which the stopping member is at the first stop position, and an extension line of a vector in a direction opposite to a vector of a force that the second engaging portion receives from the second engaged portion under a state in which the stopping member is at the second stop position.

Further, it is another object of the present invention to provide a driving force transmission apparatus, including: a first planetary gear unit including: a first engaged gear having a first engaged portion; and a first meshing gear; a second planetary gear unit including: a second engaged gear having a second engaged portion; and a second meshing gear configured to mesh with the first meshing gear; and a stopping member including: a first engaging portion engageable with the first engaged portion; and a second engaging portion engageable with the second engaged portion, the stopping member being movable, by pivoting, to a first stop position at which the first engaging portion is engaged with the first engaged portion so that the first engaged gear is stopped, and to a second stop position at which the second engaging portion is engaged with the second engaged portion so that the second engaged gear is stopped, in which a rotation direction of the first engaged gear under a state in which the stopping member is at the second stop position and a rotation direction of the second engaged gear under a state in which the stopping member is at the first stop position are reverse to each other, and in which the first engaged gear and the second engaged gear are formed into the same shape, respectively have rotation axes that are substantially parallel to each other, and are arranged so that the first engaged gear and the second engaged gear are directed to the same side along the respective rotation axes.

Further features of the present invention will become apparent from the following description of exemplary embodiments with reference to the attached drawings.

DESCRIPTION OF THE EMBODIMENTS

Now, exemplary embodiments of the present invention are described in detail. Note that, dimensions, materials, shapes, relative positions, and the like of components described in those embodiments are changed as appropriate depending on configuration of mechanisms to which the present invention is applied, or on various conditions. Thus, the scope of the present invention is not limited by those factors unless otherwise specified.

First Embodiment

Figure 1:
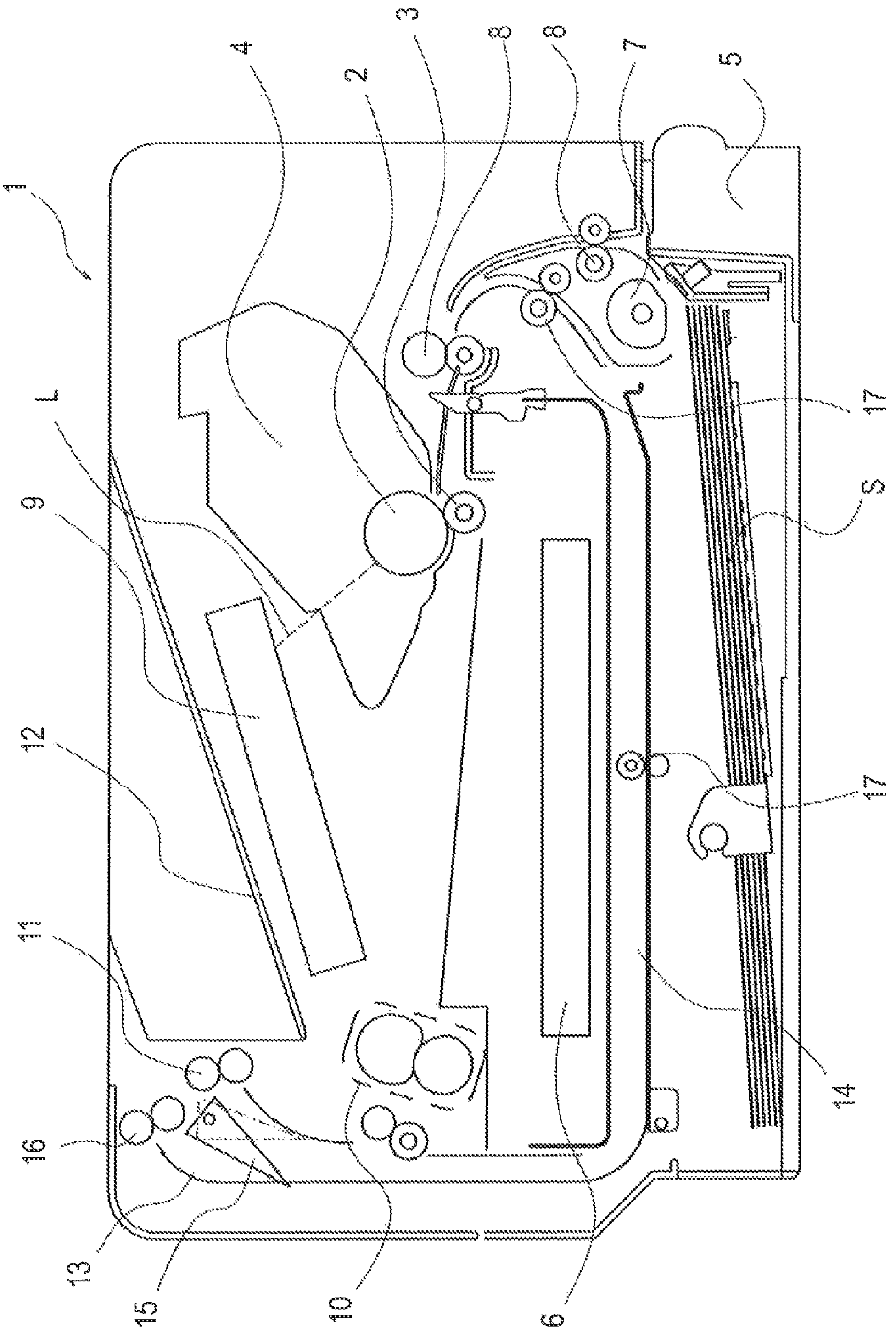
FIG. 1 is a sectional view of a configuration example of an image forming apparatus including a drive mechanism.

With reference to FIG. 1, an image forming apparatus including conveyance roller drive mechanisms (driving force transmission apparatus) according to embodiments of the present invention is described. FIG. 1 is a sectional view of a configuration example of the image forming apparatus including the conveyance roller drive mechanisms according to the embodiments of the present invention. Note that, the conveyance roller drive mechanisms are described in detail with reference to FIG. 2 and subsequent drawings.

The image forming apparatus 1 is an image forming apparatus having a duplex printing function using an electrophotographic image forming process. As illustrated in FIG. 1, in the image forming apparatus 1, an image forming unit configured to form an image on a sheet is arranged. The image forming unit includes a photosensitive drum 2 as an image bearing member, and a transfer roller 3 as a transfer device. In this embodiment, the photosensitive drum 2 is received in a process cartridge 4 so that users can replace the photosensitive drum 2 as the process cartridge 4 from the image forming apparatus 1. Note that, this process cartridge includes a charging roller (not shown) and a cleaning device (not shown).

In the image forming apparatus 1, a sheet feeding cassette 5 configured to stack therein a bundle S of sheets to be subjected to image formation is arranged. A controller (control unit) 6 is configured to control rotation of a drive motor (not shown). With this, a feed roller 7 is rotated to separate and feed the sheets one by one, and the sheet is conveyed sequentially to a portion between a plurality of conveyance roller pairs 8, and to a portion between the photosensitive drum 2 and the transfer roller 3. An image-writing laser scanner 9 emits a laser beam L so as to form an electrostatic latent image on a surface of the photosensitive drum 2 charged by the charging roller, and the electrostatic latent image on the photosensitive drum 2 is developed into a toner image by a developing device (not shown). The toner image is transferred onto a first surface of the sheet between the photosensitive drum 2 and the transfer roller 3. After that, the sheet is heated and fixed by a fixing device 10, and is conveyed onto a delivery tray 12 by a delivery roller pair 11.

Further, in the image forming apparatus 1, a duplex unit including a reverse conveyance path 13 and a duplex conveyance path 14 is arranged. This duplex unit is a conveyance unit (sheet conveyance apparatus) including a forward/reverse rotatable conveyance section configured to convey the sheet in one direction or another direction so that the sheet is conveyed while front and back surfaces thereof are inverted. On a downstream side in a sheet conveying direction with respect to the fixing device 10, the reverse conveyance path 13 is formed as another route that is branched between the fixing device 10 and the delivery roller pair 11. At this branch portion, there is arranged a path switching section 15 capable of switching paths into which the sheet is guided, specifically, switching between a conveyance path corresponding to a range from the fixing device 10 to the delivery roller pair 11, and a conveyance path corresponding to a range from the fixing device 10 to a reverse conveyance roller pair 16 (reverse conveyance path 13). This path switching section 15 is driven to be switched by a drive source (not shown).

In the reverse conveyance path 13, the reverse conveyance roller pair 16 is arranged as the forward/reverse rotatable conveyance section configured to convey the sheet in the one direction or the other direction. In a case of performing image formation on both the surfaces of the sheet, the reverse conveyance roller pair 16 is forward or reversely rotated so that the sheet that has already been subjected to image formation on its first surface is reversely conveyed into the duplex conveyance path 14. Then, the sheet is inverted such that a second surface opposite to the first surface faces the photosensitive drum, and fed into the image forming unit again by another plurality of conveyance roller pairs 17. After that, the image formation is performed on the second surface of the inverted sheet as on the first surface.

Note that, although the reverse conveyance roller pair is arranged independently of the delivery roller pair in the description of this embodiment, the present invention is not limited thereto, and is intended to be applicable also to image forming apparatus in which the reverse conveyance roller pair functions also as the delivery roller pair.

Figure 2:
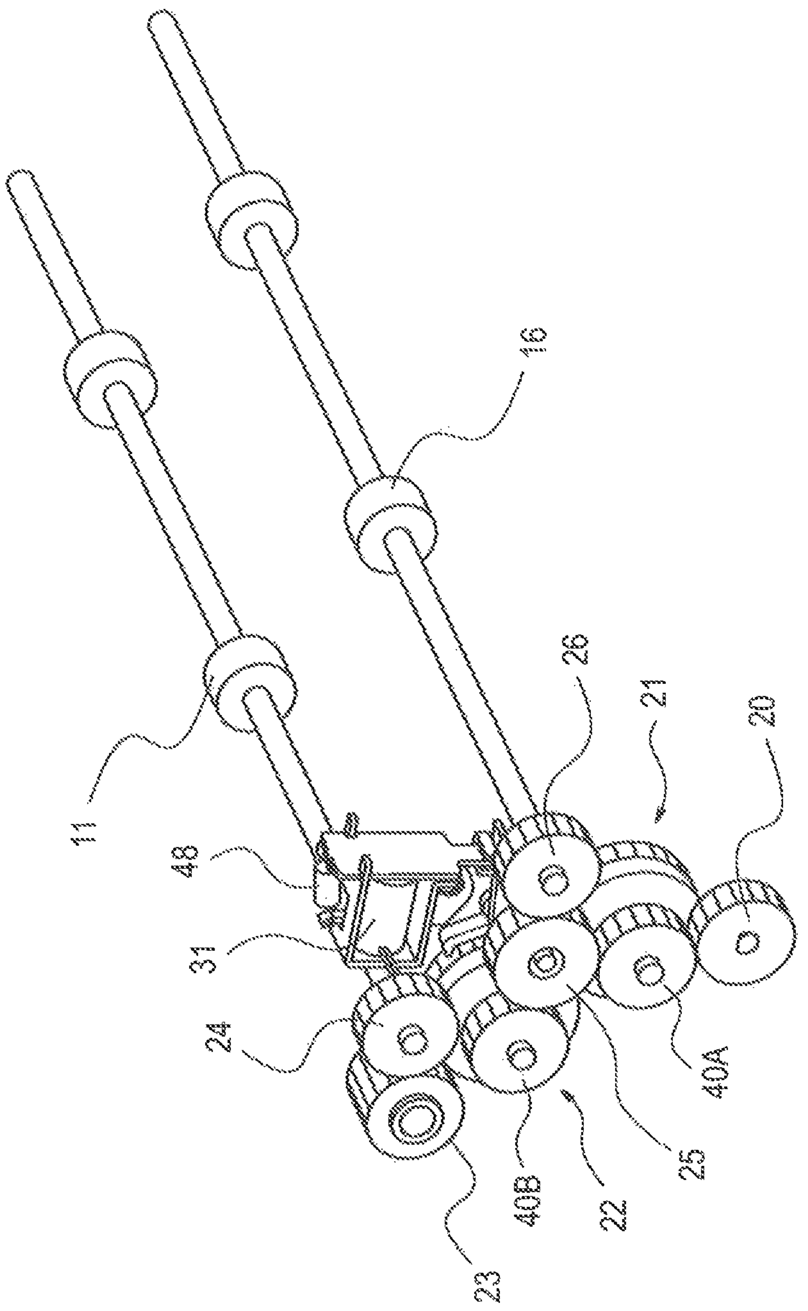
FIG. 2 is a perspective view of an internal configuration of the drive mechanism for a duplex unit.

FIG. 2 is a perspective view of an internal configuration of the conveyance roller drive mechanism (driving force transmission apparatus) for the duplex unit when viewed from an outside of the image forming apparatus, for illustrating a drive train configured to transmit a driving force to the delivery roller 11 and the reverse conveyance roller 16. The drive train of the drive mechanism illustrated in FIG. 2 includes a drive input gear 20, a first planetary gear unit 21, a second planetary gear unit 22, a delivery idler gear 23, a delivery roller gear 24, a reverse conveyance idler gear 25, and a reverse conveyance roller gear 26.

A rotational force of a motor as the drive source (not shown) is transmitted to the drive input gear 20 through intermediation of a gear train (not shown). The drive input gear 20 is rotated only in one direction, and does not have a function to be rotated both forward and reversely. Further, as illustrated in FIG. 2, the delivery roller 11 is mounted to the delivery roller gear 24, and the reverse conveyance roller 16 is mounted to the reverse conveyance roller gear 26. A gear meshing arrangement is described in detail below.

Figure 3:
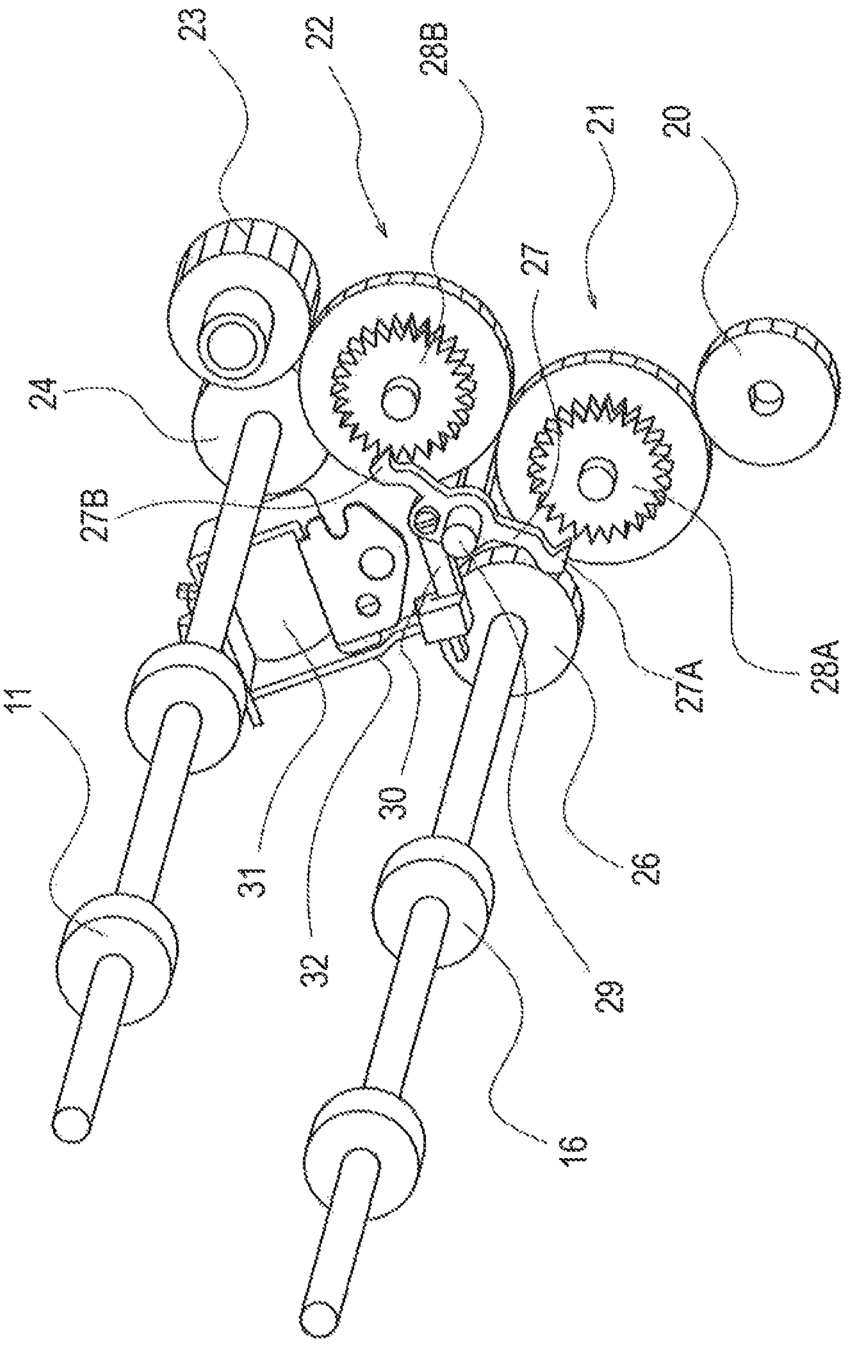
FIG. 3 is another perspective view of the internal configuration of the drive mechanism for the duplex unit.

FIG. 3 is another perspective view in which the configuration of the drive mechanism illustrated in FIG. 2 is viewed from an inside of the image forming apparatus. The first planetary gear unit 21 and the second planetary gear unit 22 respectively include a first projecting portion 28A and a second projecting portion 28B each formed so as to have a large number of latches to mesh with a stopping member 27 configured to control rotation. The stopping member 27 is a rotation stopping switching section configured to be alternately engaged with and to hold the first projecting portion 28A of the first planetary gear unit 21 and the second projecting portion 28B of the second planetary gear unit 22. The stopping member 27 integrally includes a first engaging portion 27A engageable with the first projecting portion 28A of the first planetary gear unit 21, and a second engaging portion 27B engageable with the second projecting portion 28B of the second planetary gear unit 22. The stopping member 27 is arranged so as to be pivotable about a shaft 29 as a fulcrum, and is connected to a solenoid 31 as an actuating section through intermediation of a link member 30.

The solenoid 31 is an actuator to be electrically controlled, specifically, energized to cause the reverse conveyance roller 16 to convey the sheet in the one direction, and de-energized to cause the reverse conveyance roller 16 to convey the sheet in the other direction. Thus, under a state in which the solenoid 31 is energized so that a solenoid flapper 32 is attracted to a solenoid body, as illustrated in FIG. 3, the second engaging portion 27B of the stopping member 27 is engaged with and holds the second projecting portion 28B of the second planetary gear unit 22. Further, under the state in which the solenoid 31 is de-energized, the solenoid flapper 32 is spaced apart from the solenoid body. At this position, the first engaging portion 27A of the stopping member 27 is engaged with and holds the first projecting portion 28A of the first planetary gear unit 21. Note that, the stopping member 27 pivots about the pivot fulcrum so that one engaging portion is engaged with one projecting portion so that rotation of a sun gear integrally including the one projecting portion is restricted. At the same time, another engaging portion is disengaged from another projecting portion so that restriction of rotation of another sun gear integrally including the other projecting portion is released.

Figure 4A:
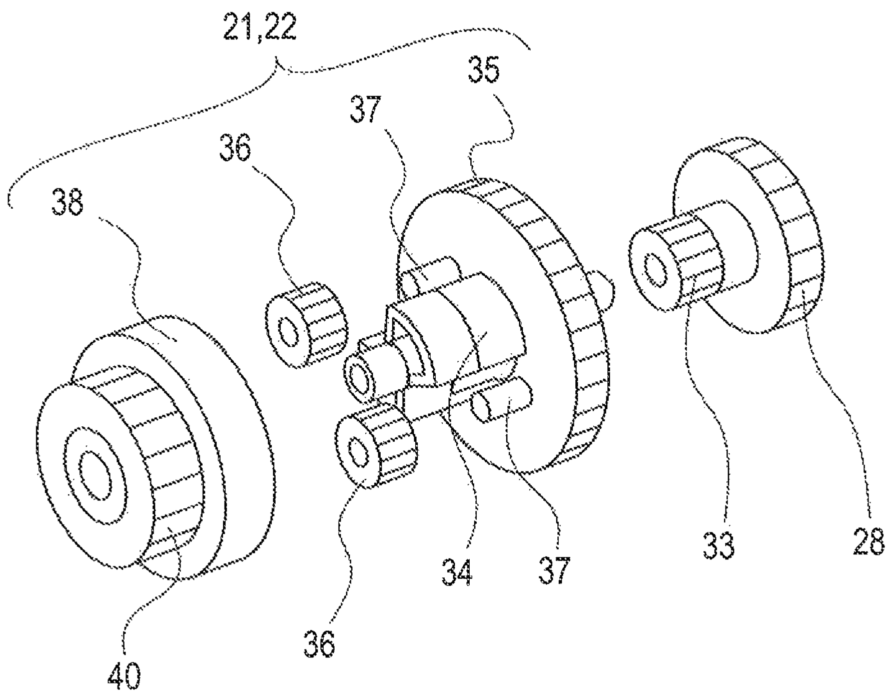
FIGS. 4A and 4B are exploded views of a configuration of a first planetary gear unit and a second planetary gear unit.
Figure 4B:
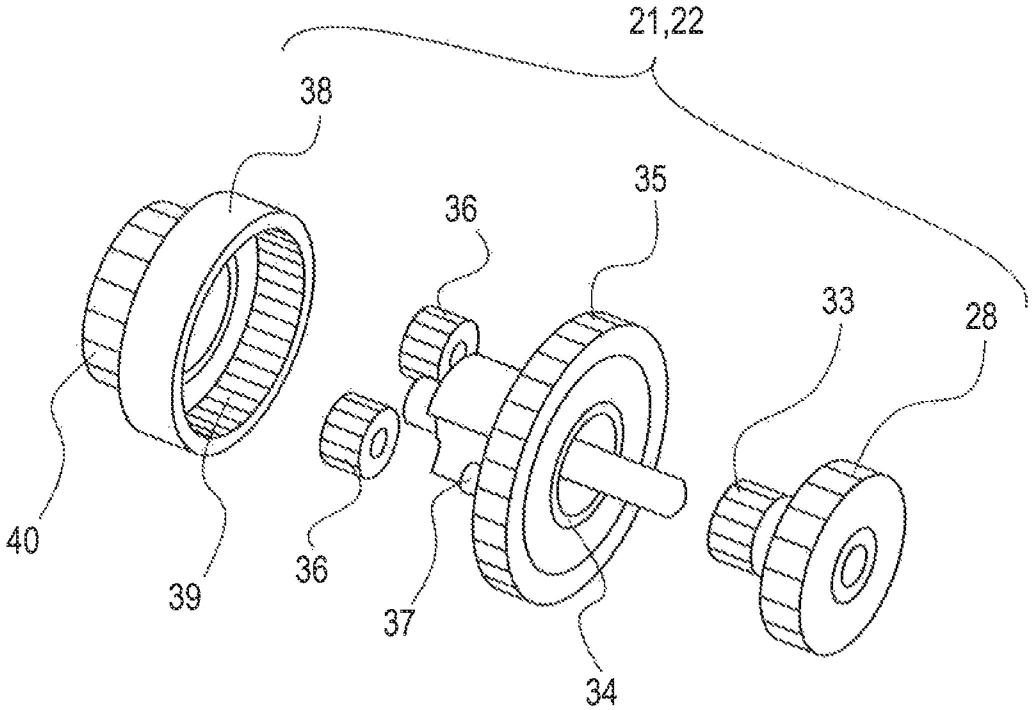

FIGS. 4A and 4B are exploded views of a configuration of the first planetary gear unit 21 and the second planetary gear unit 22. FIGS. 4A and 4B are exploded perspective views when viewed from different viewpoints in the first planetary gear unit 21.

Note that, hereinafter, because the components of the first planetary gear unit 21 and the second planetary gear unit 22 have the same shapes and the same combination, the components of the second planetary gear unit 22 are the same as the first planetary gear unit 21. In the following description, therefore, in a case where specific distinctions of the components need to be made between the first planetary gear unit and the second planetary gear unit, the words “first” and “second” are added to the beginning of the names of the components, and suffixes “A” and “B” are respectively added to the ends of the same reference numerals. The components of the first planetary gear unit are indicated with the suffix “A”, and the components of the second planetary gear unit are indicated with the suffix “B”, thereby distinguishing the common components. For example, an input gear portion 35 represents an example of the first gear portion 35A of the first planetary gear unit 21 and the second gear portion 35B of the second planetary gear unit 22.

As illustrated in FIGS. 4A and 4B, a sun gear 33 and a projecting portion (engaged portion) 28 are integrally arranged as a coaxially rotatable engaged gear. The engaged gears of the first planetary gear unit and the second planetary gear unit are members having the same shape obtained by forming a resin into the same die set or die sets having substantially the same shape. In addition, the engaged gears of the first planetary gear unit and the second planetary gear unit respectively have rotation axes that are substantially parallel to each other, and are arranged so that the engaged gears are directed to the same side along the respective rotation axes. An input gear portion 35 is formed along an outer periphery of a carrier 34, and a central shaft of the carrier 34 holds the sun gear 33. Further, in this embodiment, the carrier 34 integrally includes shafts 37 configured to support two planetary gears 36 so as to revolve about the sun gear 33. Note that, the number of the planetary gears is not particularly limited as long as at least one planetary gear is arranged. An internal gear 38 integrally includes an internal gear portion 39 configured to mesh with outsides of the planetary gears 36, and an output gear portion 40, which are coaxial with each other. With this configuration, for example, in a case where the input gear portion 35 is rotated by a driving force input thereto under a state in which rotation of the projecting portion 28 is restricted, the planetary gears 36 revolve around the sun gear 33 that is restricted from rotation. In conjunction therewith, the internal gear portion 39 and the output gear portion 40 are rotated in the same direction as that of the input gear portion 35.

Figure 5:
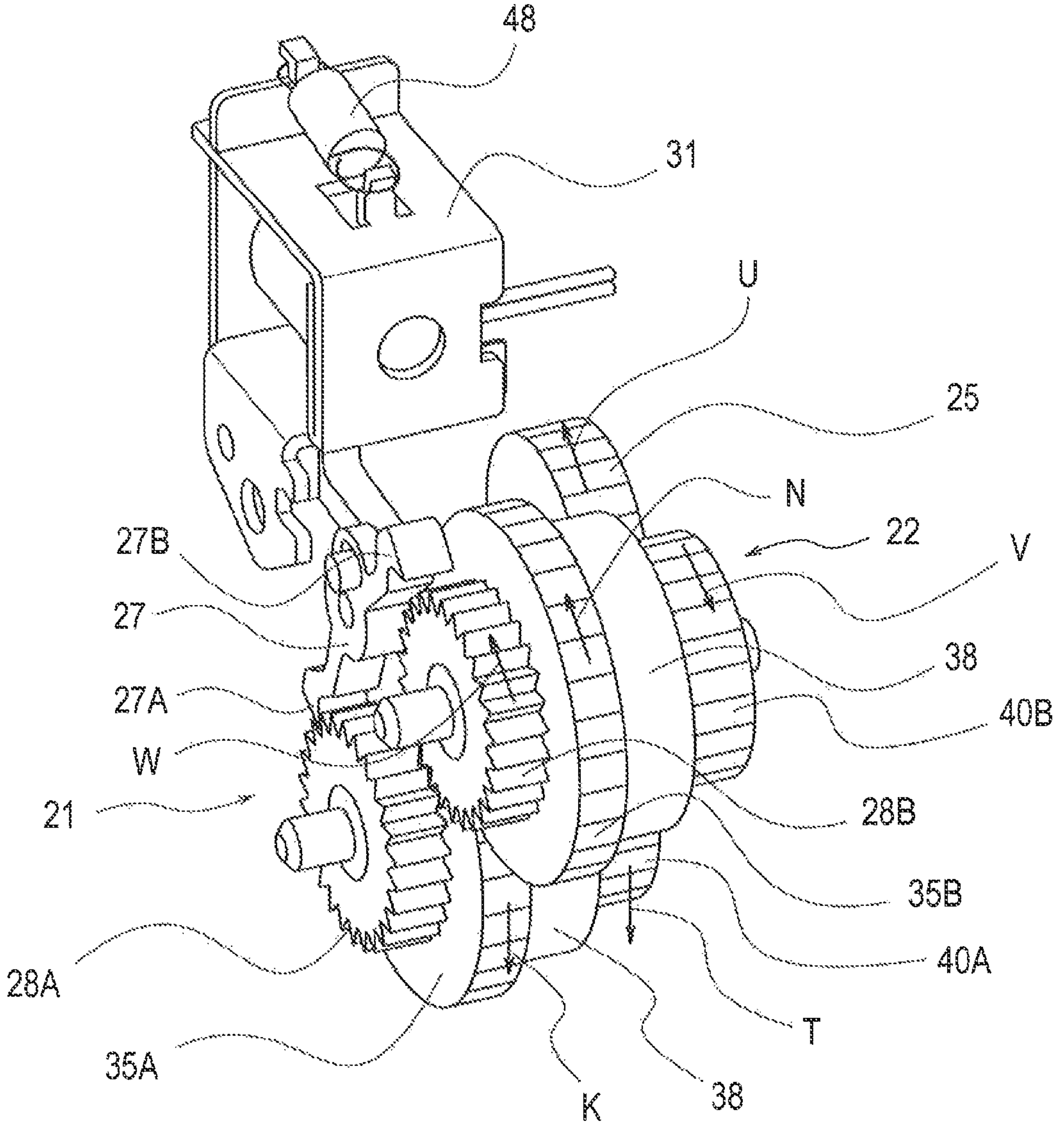
FIG. 5 is a perspective view illustrating rotations in configurations of the first planetary gear unit and the second planetary gear unit.
Figure 6:
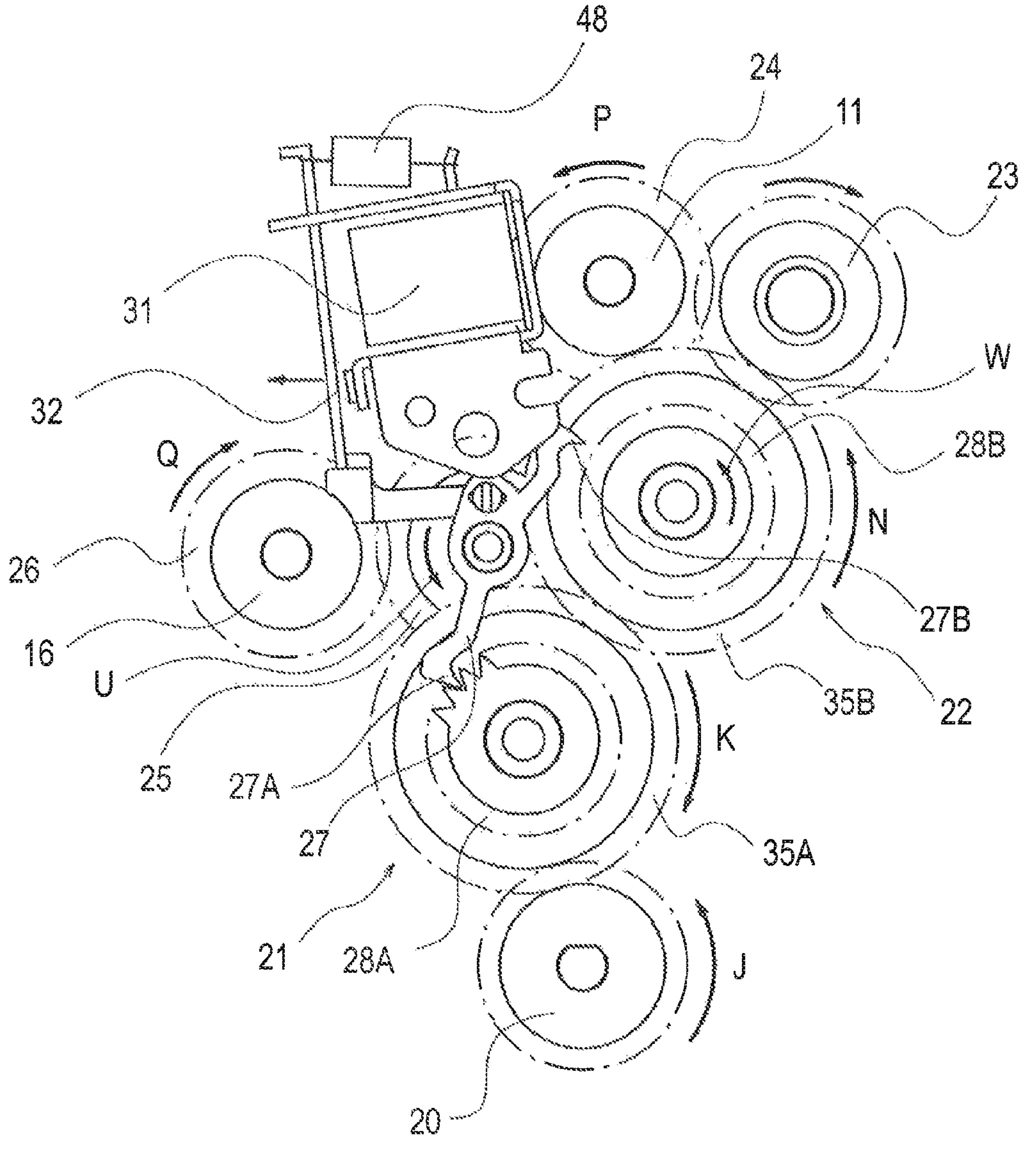
FIG. 6 is a side view illustrating rotations of gears of the drive mechanism.
Figure 7:
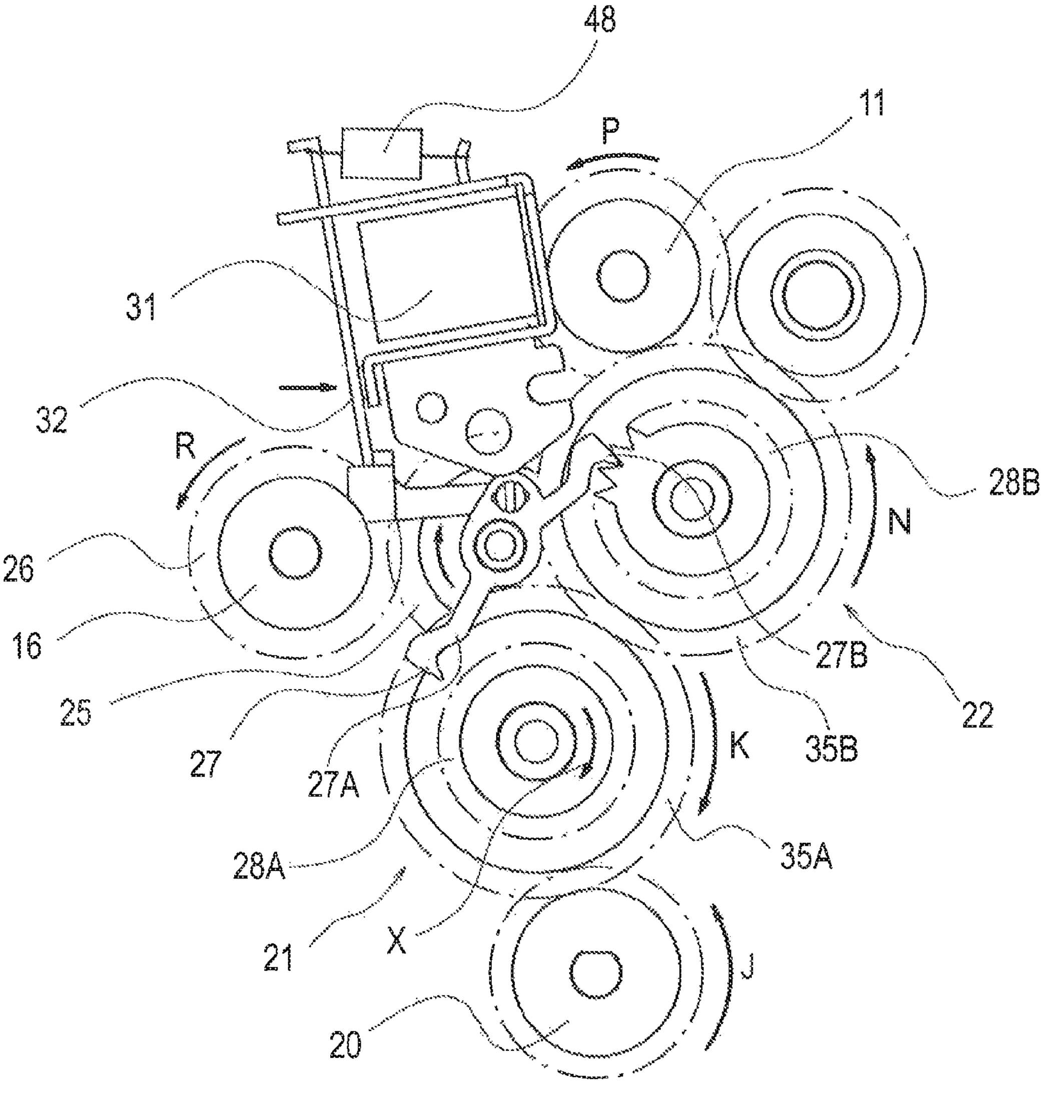
FIG. 7 is a side view illustrating rotations of the gears of the drive mechanism.

FIGS. 5, 6, and 7 are views illustrating the rotations of the gears. FIG. 5 is a perspective view, and FIGS. 6 and 7 are views when viewed from the left side in FIG. 5, that is, from the inside of the image forming apparatus.

FIGS. 5 and 6 each illustrate a state in which the first engaging portion 27A of the stopping member 27 is engaged with and holds the first projecting portion (first engaged portion) 28A of the first planetary gear unit 21. In FIG. 6, the drive input gear 20 that is rotated to the left (rotated in a direction of the arrow J) causes a first input gear portion 35A of the first planetary gear unit 21 to be rotated to the right (rotated in a direction of the arrow K).

First, a drive train for the delivery roller 11 is described. The first planetary gear unit 21 and the second planetary gear unit 22 mesh with each other through intermediation of the first input gear portion 35A and a second input gear portion 35B. Thus, the second input gear portion 35B of the second planetary gear unit 22 is rotated to the left in FIG. 6 (rotated in a direction of the arrow N). The delivery roller gear 24 is rotated to the left (rotated in a direction of the arrow P) by the rotation transmitted from the second input gear portion 35B of the second planetary gear unit 22 through intermediation of the delivery idler gear 23. With this, the delivery roller 11 is rotated in only one direction in which the sheets are delivered. In this way, the planetary gear units are used not only for reverse conveyance as described below, but also as another drive train (in this case, drive train for the delivery roller). Thus, effects such as reduction in number of components can be obtained.

Next, a drive train for the reverse conveyance roller pair 16 is described. The reverse conveyance idler gear 25 as a driven gear meshes with both a first output gear portion 40A of the first planetary gear unit 21 and a second output gear portion 40B of the second planetary gear unit 22 (refer to FIGS. 2, 4A, and 4B). As described above, in conjunction with the rotation of the drive input gear 20, the first input gear portion 35A of the first planetary gear unit 21 is rotated to the right in FIG. 6 (rotated in the direction of the arrow K). The first projecting portion 28A of the first planetary gear unit 21 is held by the first engaging portion 27A of the stopping member 27. Thus, the first output gear portion 40A of the first planetary gear unit 21 is also rotated to the right (rotated in a direction of the arrow T in FIG. 5). With this, the driving force is output to the reverse conveyance idler gear 25, and the reverse conveyance idler gear 25 is rotated to the left (rotated in a first direction, that is, rotated in a direction of the arrow U). Thus, the reverse conveyance roller 16 receives the driving force through intermediation of the reverse conveyance idler gear 25, and is rotated to the right (rotated in a direction of the arrow Q), that is, rotated in a reverse rotation direction in which the sheets are reversely fed. Note that, the other direction refers to the reverse rotation direction in which the sheets are reversely fed, and meanwhile, the one direction refers to a forward rotation direction described below, in which the sheets are fed forward.

Simultaneously, through intermediation of the reverse conveyance idler gear 25, the driving force is input to the second output gear portion 40B of the second planetary gear unit 22 in a direction of the arrow V in FIG. 5. However, as illustrated in FIG. 6, the second projecting portion 28B of the second planetary gear unit 22 is not held by the stopping member 27, and hence is in a free state. Thus, through intermediation of the planetary gears 36 (refer to FIGS. 4A and 4B), the second projecting portion 28B of the second planetary gear unit 22 idles in a direction of the arrow W in FIGS. 5 and 6.

Note that, the state illustrated in FIG. 6 corresponds to a state in which the sheet is delivered onto the delivery tray, and corresponds to a position at the time when the sheet is reversely conveyed into the duplex conveyance path. In this state, the solenoid 31 is de-energized, and hence the solenoid flapper 32 is retracted by a tension spring 48 of the solenoid 31. This operation causes the first engaging portion 27A of the stopping member 27 to come to a position of being engaged with the first projecting portion 28A of the first planetary gear unit 21.

Meanwhile, FIG. 7 illustrates a state in which the second engaging portion 27B of the stopping member 27 is engaged with and holds the second projecting portion 28B of the second planetary gear unit 22. In FIG. 7, the rotation directions of the drive input gear 20, the first input gear portion 35A of the first planetary gear unit 21, the second input gear portion 35B of the second planetary gear unit 22, and the delivery roller 11 (directions of the arrows J, K, N, and P, respectively) are the same as those in FIG. 6.

Meanwhile, in FIG. 7, the second projecting portion 28B of the second planetary gear unit 22 is held by the second engaging portion 27B of the stopping member 27. Thus, the second output gear portion 40B (illustrated in FIG. 5) of the second planetary gear unit 22 is rotated to the left in FIG. 7, and the reverse conveyance idler gear is rotated in conjunction therewith to the right (rotated in a second direction). With this, the driving force is output. In other words, the reverse conveyance roller 16 is rotated to the left (rotated in a direction of the arrow R), that is, rotated in the forward rotation direction in which the sheet is fed forward.

Simultaneously, through intermediation of the reverse conveyance idler gear 25, the driving force is input to the first output gear portion 40A (illustrated in FIG. 5) of the first planetary gear unit 21. However, as illustrated in FIG. 7, the first projecting portion 28A of the first planetary gear unit 21 is not held by the stopping member 27, and hence is in a free state. Thus, through intermediation of the planetary gears 36 (refer to FIGS. 4A and 4B), the first projecting portion 28A of the first planetary gear unit 21 idles in a direction of the arrow X in FIG. 7.

Note that, the state illustrated in FIG. 7 corresponds to a position at the time when the sheet is fed forward by the reverse conveyance roller 16 in the reverse conveyance path. In this state, the solenoid 31 is energized, and hence the solenoid flapper 32 is in an attracted state. An attraction force is generated so that attraction is performed against a tensile force of the tension spring 48. This operation causes the second engaging portion 27B of the stopping member 27 to come to a position of being engaged with the second projecting portion 28B of the second planetary gear unit 22.

In a case where simplex printing is performed by the operation described with reference to FIGS. 6 and 7, the reverse conveyance roller pair 16 is not used. Thus, the solenoid 31 is de-energized. In this state, the reverse conveyance roller pair 16 has received the driving force, and hence is rotated. Now, the simplex printing is described with reference to FIG. 1. At the time of the simplex printing, as illustrated in FIG. 1, the path switching section 15 is set in advance to a position from which the sheet is conveyed into the conveyance path corresponding to the range from the fixing device 10 to the delivery roller pair 11 (delivery path) (position indicated by the solid line). With this, the sheet that has already been subjected to the simplex printing is guided into the conveyance path on the delivery roller pair side by the path switching section 15. Thus, even when the reverse conveyance roller pair is rotated at the time of the simplex printing, the sheet is not conveyed by the reverse conveyance roller pair.

Meanwhile, in a case where duplex printing is performed, the sheet that has already been subjected to the printing on its first surface is first fed into the reverse conveyance path 13. At this time, the path switching section 15 is switched to a position from which the sheet is conveyed to the reverse conveyance path 13 (position indicated by the two-dot chain line), and the solenoid 31 is energized. In this state, the rotation direction of the reverse conveyance roller pair 16 is set to the direction in which the sheet is conveyed forward. Thus, the sheet that has already been subjected to the printing on its first surface is guided into the conveyance path on the reverse conveyance roller pair side by the path switching section 15. The sheet is conveyed forward by a predetermined amount until a trailing end of the sheet reaches a vicinity of the branch position to the duplex conveyance path 14 via the fixing device 10, that is, a vicinity of a distal end of the path switching section 15. At this stage, the solenoid 31 is de-energized again so that the rotation direction of the reverse conveyance roller pair 16 is reversed. Note that, the series of operations is controlled by the controller 6 and sensors or the like (not shown). In this way, the sheet that has already been subjected to the printing on its first surface is fed into the duplex conveyance path 14, and then fed into the image forming unit again for the printing on its second surface.

Note that, there are no particular operational problems even when the logic of the energization and de-energization of the solenoid 31 is reversed to that described in this embodiment by way of an example of the series of reverse conveyance operations of conveying the sheet in the one direction or the other direction using the reverse conveyance roller pair 16. However, in consideration of electric power consumption and an increase in temperature in the image forming apparatus, when the logic described in this embodiment is selected, the energization need not be performed until the start of the reverse conveyance after the sheet is fed into the reverse conveyance path. In this way, an energized time period can be shortened relative to a non-energized time period. In view of this, the logic described in this embodiment is suited.

Further, for the same reason, in the image forming apparatus in which the reverse conveyance roller pair functions also as the delivery roller pair, it is desired that the solenoid not be energized until the sheet passes through the reverse conveyance roller pair after the start of the reverse rotation.

Figure 8:
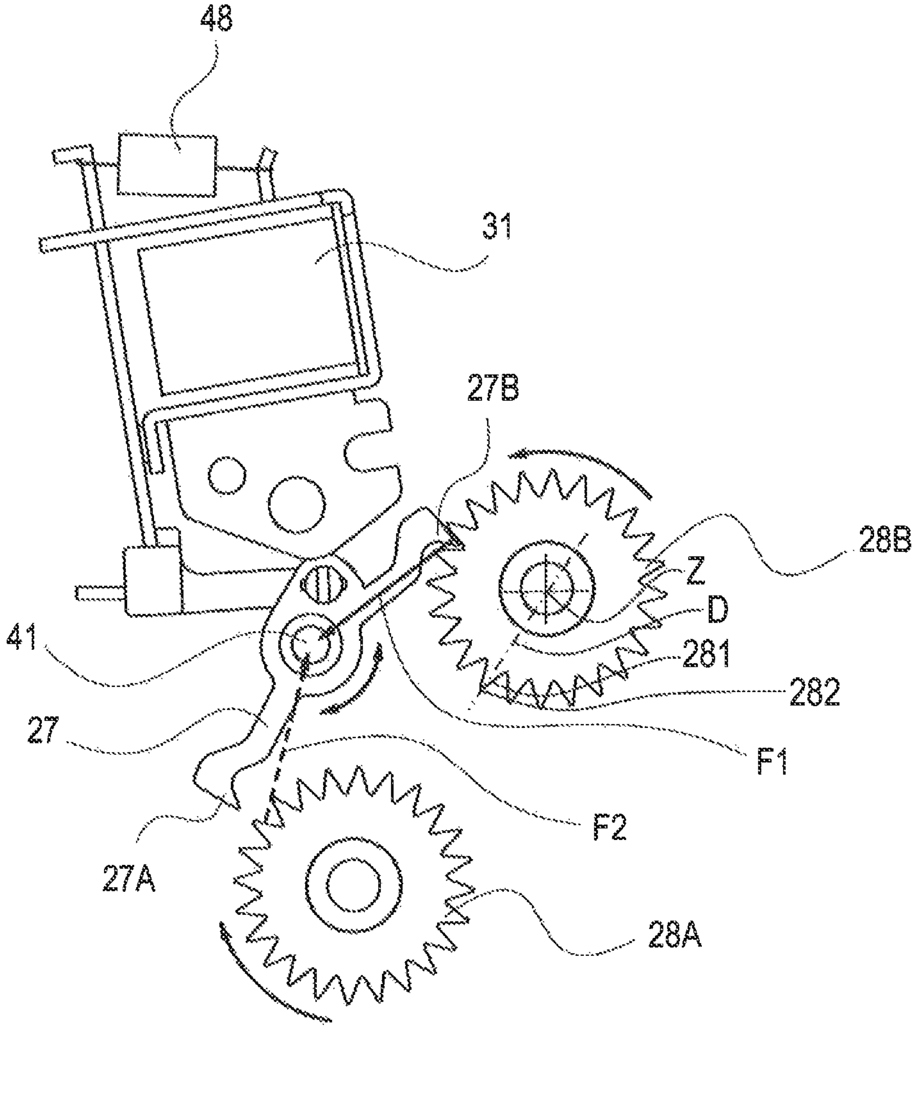
FIG. 8 is a schematic side view of an engaged state of a stopping member and a projecting portion.

FIG. 8 is a view of an engaged state of the second engaging portion 27B of the stopping member 27 and the second projecting portion 28B. A vector of the force F1 that the stopping member 27 receives from a contact point between the second engaging portion 27B and the second projecting portion 28B corresponds to a vector that extends from the contact point between the second engaging portion 27B and the second projecting portion 28B to the stopping member 27 in a direction orthogonal to a surface of the second projecting portion 28B as indicated by the straight solid-line arrow in FIG. 8. A vector of the force F2 that the stopping member 27 receives from a contact point between the first engaging portion 27A and the first projecting portion 28A corresponds to a vector that extends from the contact point between the first engaging portion 27A and the first projecting portion 28A to the stopping member 27 in a direction orthogonal to a surface of the first projecting portion 28A as indicated by the broken-line arrow in FIG. 8. In this embodiment, the two engaging portions (arm portions) of the stopping member 27 are formed into a symmetrical shape with respect to a pivot fulcrum. As the pivot fulcrum (pivot shaft) of the stopping member 27, a pivot fulcrum 41 is formed at an intersection between an extension line of the vector of the force F1 that the second engaging portion 27B receives from the second projecting portion 28B (straight solid-line arrow in FIG. 8) and an extension line of the vector of the force F2 that the first engaging portion 27A receives from the first projecting portion 28A (broken-line arrow in FIG. 8). Further, a plurality of claw portions (engaging portions) 281 arranged on each of the first projecting portion 28A and the second projecting portion 28B so as to be respectively engageable with the first engaging portion 27A and the second engaging portion 27B of the stopping member 27 are each formed into a symmetrical shape with respect to the straight line D connecting a rotation center Z of corresponding one of the projecting portions 28 and a distal end 282 of the claw portion 281 to each other. With this, all stress that the stopping member 27 receives from the projecting portions 28 under the engaged state is applied to the pivot fulcrum 41 of the stopping member 27. As a result, reliable engagement can be performed without applying load on the solenoid 31 at the time of the engagement or switching (disengagement).

Figure 9:
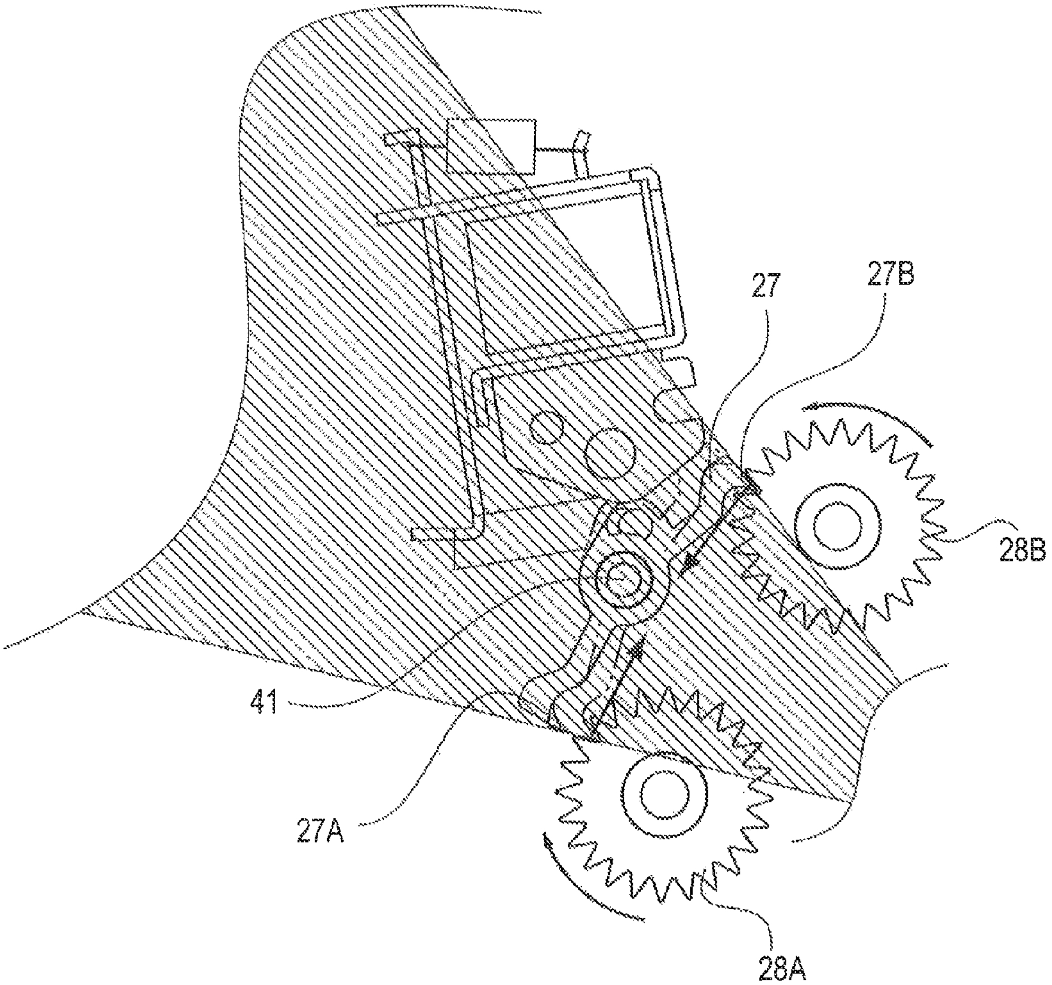
FIG. 9 is a view of a region in which a pivot fulcrum of the stopping member is arranged.

Note that, the pivot fulcrum 41 need not necessarily be arranged on the extension lines of the vectors of the force F1 and the force F2 as long as the pivot fulcrum 41 falls within the shaded region illustrated in FIG. 9. With this, the engaging portions of the stopping member 27 receive pressing forces from the projecting portions of the planetary gear units. In this way, an object to form the two planetary gear units into the same shape can be achieved. Note that, the shaded region indicates a region between normal directions respectively with respect to a contact surface at an engagement position between the claw portion of the first projecting portion 28A and the first engaging portion 27A, and a contact surface at an engagement position between the claw portion of the second projecting portion 28B and the second engaging portion 27B. In other words, when viewed in a direction of a pivot axis of the stopping member 27, with respect to a plane extended from the contact surface between the first projecting portion 28A and the first engaging portion 27A, the pivot fulcrum 41 of the stopping member 27 is arranged in a region on a side on which the vector of the force F2 that the first engaging portion 27A receives from the first projecting portion 28A extends. In addition, with respect to a plane extended from the contact surface between the second projecting portion 28B and the second engaging portion 27B, the pivot fulcrum 41 of the stopping member 27 is arranged in a region on a side on which the vector of the force F1 that the second engaging portion 27B receives from the second projecting portion 28B extends.

Figure 10:
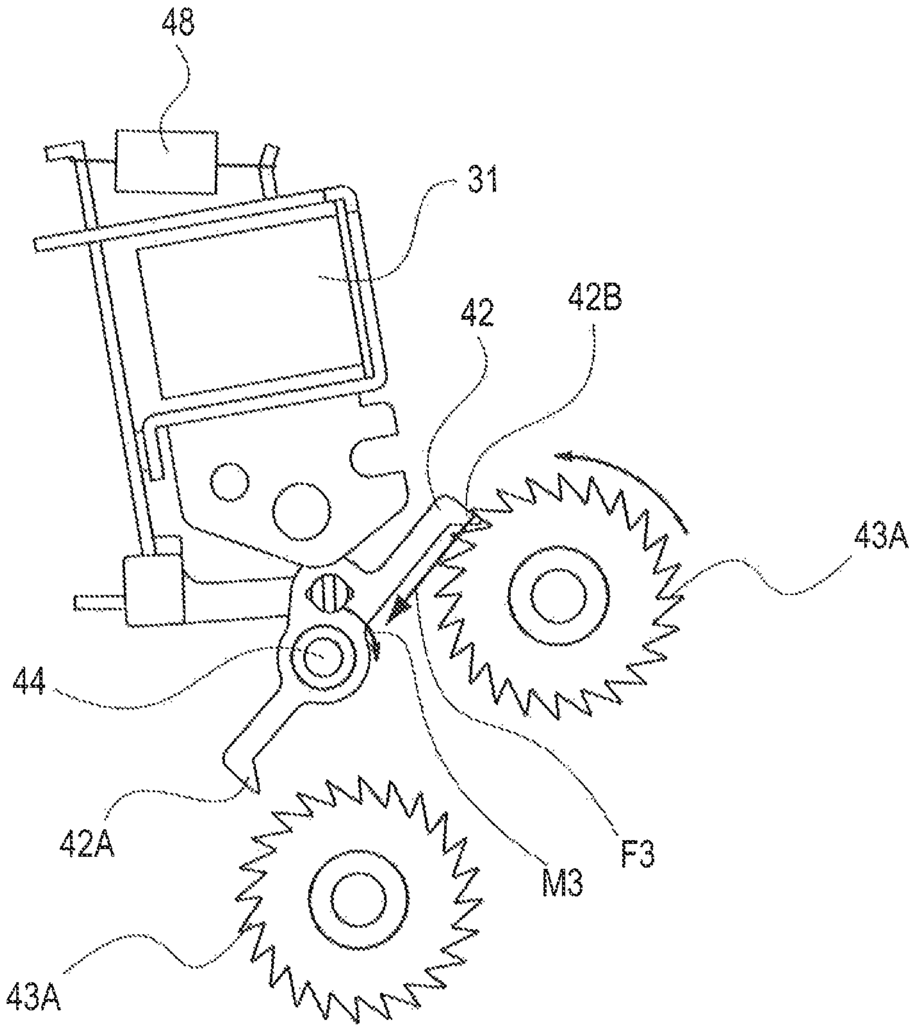
FIG. 10 is a schematic side view of a modification of a drive mechanism according to a first embodiment of the present invention.

FIG. 10 is a view illustrating a modification of the positional relationship between the pivot fulcrum and the engagement positions of the projecting portions as described above, and a modification of the shapes of the projecting portions. Note that, although the modification of the positional relationship between the pivot fulcrum and the engagement positions of the projecting portions, and the modification of the shapes of the projecting portions are independently applicable, for the sake of convenience of description, those modifications are described with reference to the same drawing.

First, the modification of the positional relationship between the pivot fulcrum and the engagement positions of the projecting portions is described. A vector of the force F3 corresponds to such a direction that a moment M3 in a biting direction is generated at the time when a stopping member 42 is engaged. In order to perform stronger engagement, such a positional relationship may be selected. In contrast, a positional relationship for generating a moment in a disengaging direction is effective in a case where the stopping member has to be switched with a lower torque.

Next, the modification of the shapes of the projecting portions is described. In the illustration of FIG. 9 and preceding drawings, the projecting portions formed coaxially and integrally with the sun gears are formed into a bilateral symmetrical shape respectively with respect to the engaging portions of the stopping member. Meanwhile, in the example in FIG. 10, a first projecting portion 43A and a second projecting portion 43B formed coaxially and integrally with sun gears are each formed into a bilateral asymmetrical shape respectively with respect to engaging portions 42A and 42B of the stopping member 42. Also in a case where such shapes are employed, when, for example, a shape of the stopping member 42 (specifically, shapes of engaging portions 42A and 42B about a pivot fulcrum 44 of the stopping member 42) is optimized, the projecting portions to be used in the two planetary gear units can be formed into the same shape. The pivot fulcrum 44 is arranged as in the description with reference to FIG. 9.

Figure 11:
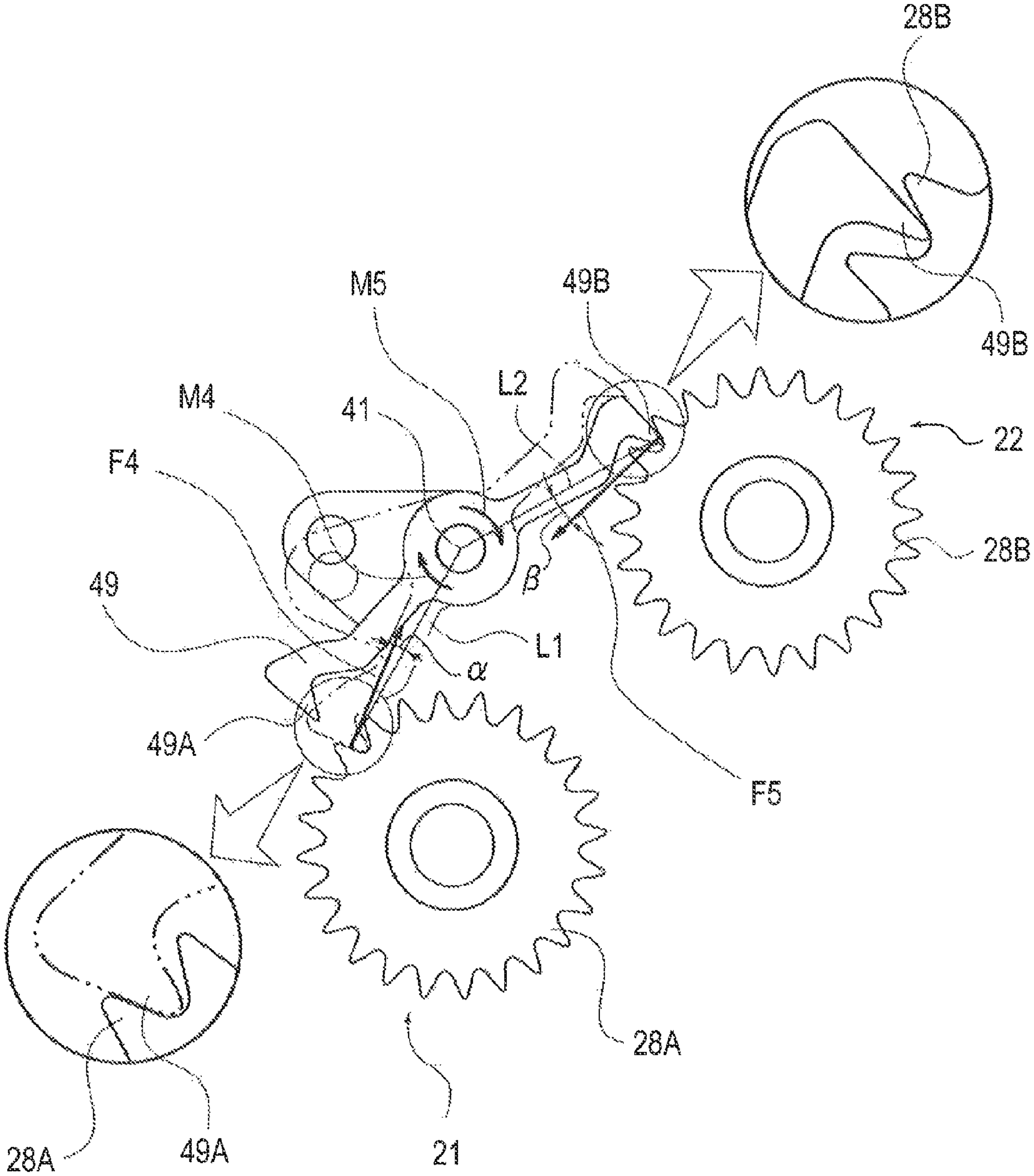
FIG. 11 is a schematic side view of another modification of a drive mechanism according to the first embodiment.

FIG. 11 is a view of a modification of the shape of the stopping member. As described above in this embodiment, the solenoid 31 is energized to generate an electromagnetic attraction force (electromagnetic operating force) against the tensile force of the tension spring 48 (non-electromagnetic operating force) so that the solenoid flapper 32 is operated. Thus, the electromagnetic attraction force is greater than the tensile force of the spring. For example, the engaged state of the second engaging portion 27B and the second projecting portion 28B, which is illustrated in FIG. 7, is maintained by the electromagnetic attraction force of the solenoid 31, and is released by the tensile force of the spring 48 as a non-magnetic section. In contrast, the engaged state of the first engaging portion 27A and the first projecting portion 28A, which is illustrated in FIG. 6, is maintained by the tensile force of the spring 48, and is released by the electromagnetic attraction force of the solenoid 31. Thus, in a case where a small solenoid that generates a low attraction force is used, the tensile force of the spring is further reduced. As a result, the force of releasing the engaged state of FIG. 7, or the force of maintaining the engaged state of FIG. 6 may be insufficient.

As a countermeasure against those problems, as illustrated in FIG. 11, it is also effective to form two engaging portions of a stopping member 49 into shapes asymmetrical with each other so that unequal moments M4 and M5 are generated by the forces received from the projecting portions 28A and 28B. Specifically, as illustrated in FIG. 11, the two engaging portions of the stopping member 49 are formed into shapes asymmetrical with each other so that an angle $\alpha$ to be formed in the first planetary gear unit 21 and an angle $\beta$ to be formed in the second planetary gear unit 22 are differentiated from each other. With this, the above-mentioned moments M4 and M5 are differentiated from each other. The angle $\alpha$ is formed between a direction of the force F4 to be applied from the first projecting portion 28A of the first planetary gear unit 21 to a first engaging portion 49A of the stopping member 49 and a straight line L1 connecting the first engaging portion 49A and the pivot fulcrum 41 of the stopping member 49 to each other. The angle $\beta$ is formed between a direction of the force F5 to be applied from the second projecting portion 28B of the second planetary gear unit 22 to a second engaging portion 49B of the stopping member 49 and a straight line L2 connecting the second engaging portion 49B and the pivot fulcrum 41 of the stopping member 49 to each other.

Specifically, a distal end of the engaging portion of the stopping member, which is engaged by the attraction force of the solenoid 31, is formed so as to generate a small biting force, or to receive a force in a direction in which the engaging portion is relatively easily disengaged. In FIG. 11, this force is generated in a direction indicated by the arrow F4 in FIG. 11, and the moment M4 in the disengaging direction is applied to the stopping member 49. Even in a case where the force in the disengaging direction is applied, when the attraction force of the solenoid 31 is sufficiently great, the force in the disengaging direction can be overcome. As a result, the engaged state can be maintained. Meanwhile, a distal end of the engaging portion of the stopping member, which is engaged by the tensile force of the tension spring 48, is formed so as to generate a relatively greater biting force. With this, the engagement can be maintained even by a smaller holding force. In this embodiment, this biting force is generated in a direction indicated by the arrow F5 in FIG. 11, and the moment M5 in the biting direction is applied to the stopping member 49.

As described above, according to the first embodiment, the forces to be applied from the projecting portions of each of the first planetary gear unit and the second planetary gear unit at the time of engagement are generated toward a vicinity of the pivot shaft of the stopping member. Thus, external forces need substantially not be applied to maintain the engagement, and a load is not substantially applied to the solenoid at the time of engagement. As a result, reliable engagement can be performed. In this way, not only the shapes of the first planetary gear unit and the second planetary gear unit but also the shapes of the projecting portions thereof can be each formed into the same shapes, and hence the pair of planetary gear units are mountable compatibly with each other at the time of apparatus assembly. As a result, a risk of a mistake in assembly can be eliminated. In addition, for the reason described above, assembly work efficiency can be increased, and costs for management and manufacture of components can be suppressed. Further, this configuration according to the first embodiment is advantageous in downsizing.

Second Embodiment

Figure 12:
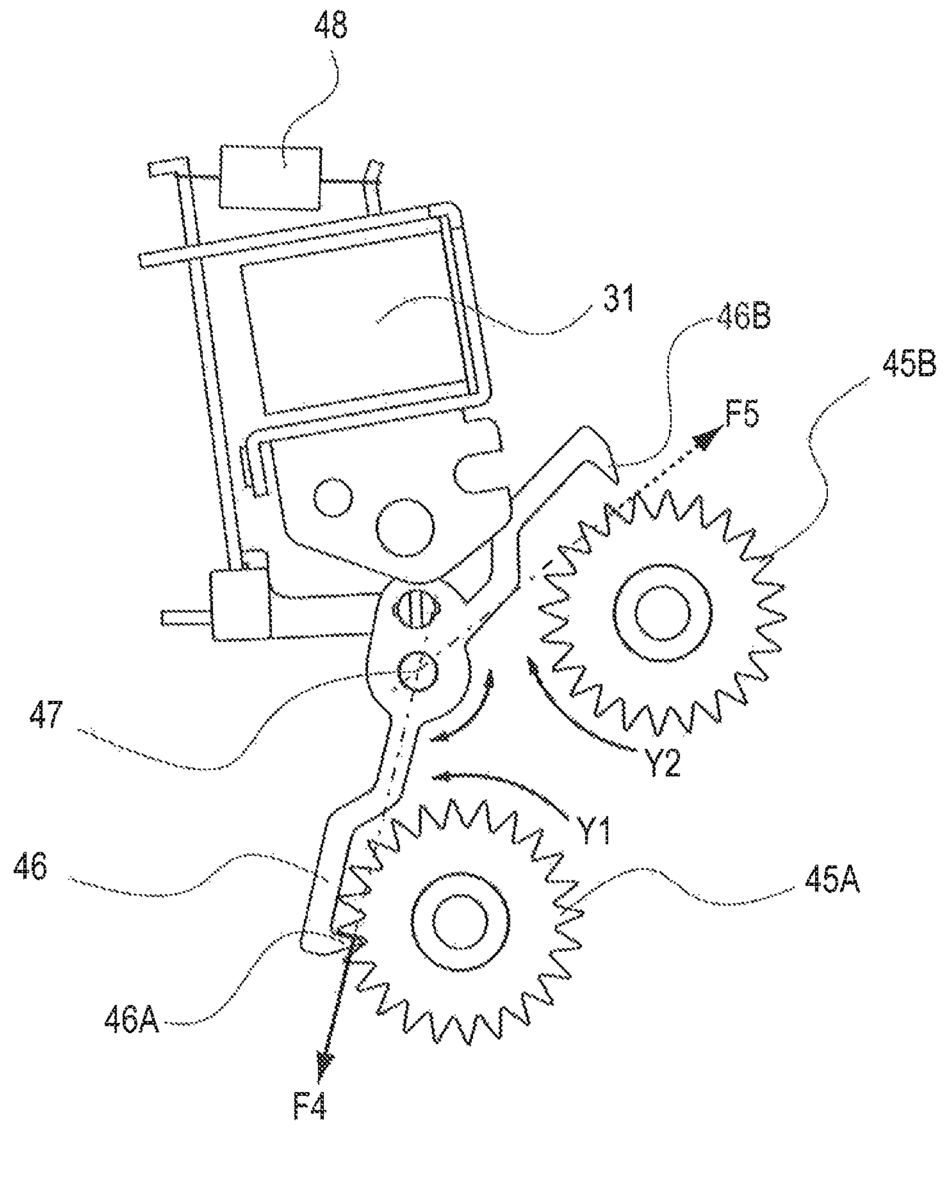
FIG. 12 is a schematic side view of a configuration of a drive mechanism according to a second embodiment of the present invention.
Figure 13:
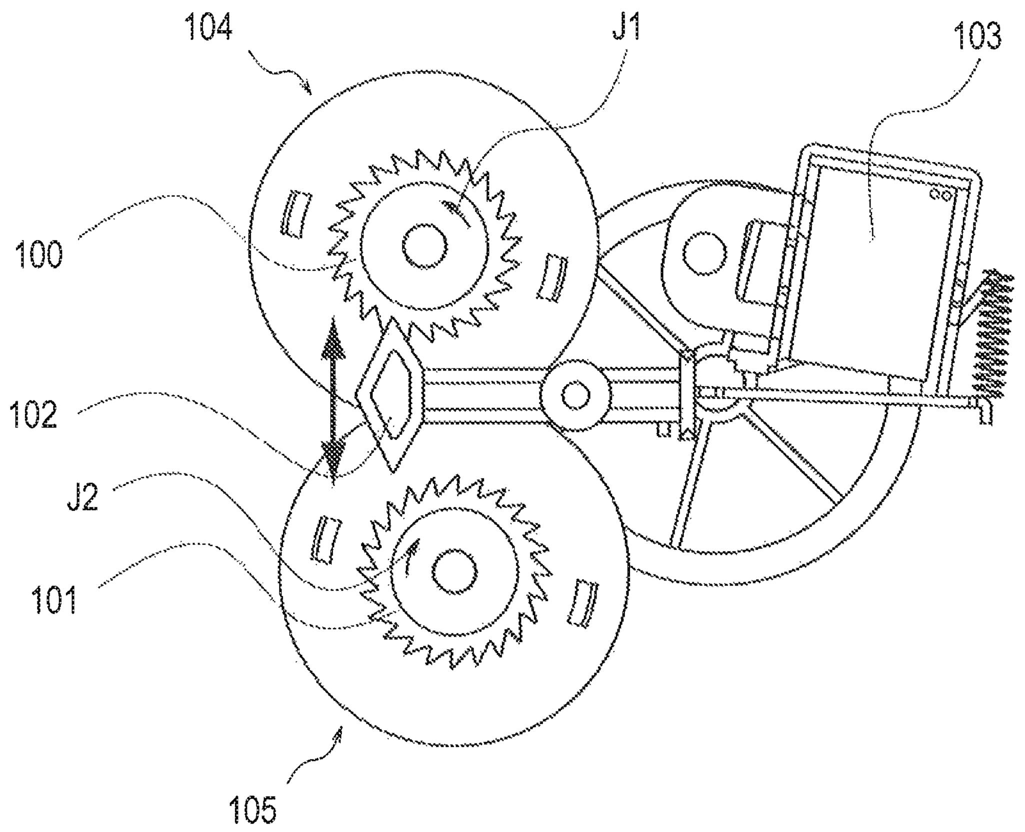
FIG. 13 is a view illustrating a related-art example.
Figure 14:
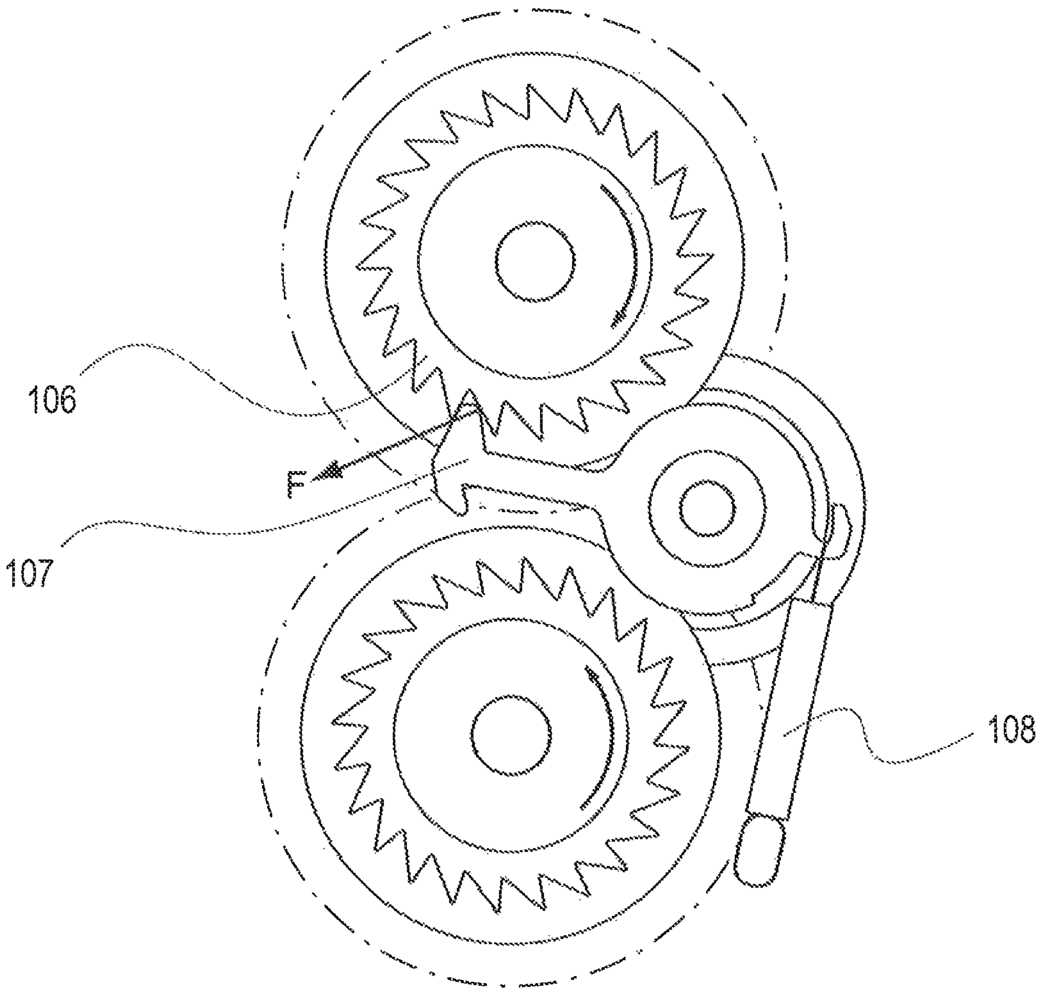
FIG. 14 is a view illustrating another related-art example.

FIG. 12 is a view of a feature configuration of a conveyance roller drive mechanism according to a second embodiment of the present invention. In the conveyance roller drive mechanism according to the second embodiment, the same components and effects as those of the first embodiment are described by using the same reference symbols to omit redundant description thereof as appropriate. Further, an image forming apparatus to which this embodiment is applied is the same as that of the first embodiment, and hence is not described.

In the first embodiment, the forces that the projecting portions of the pair of planetary gear units apply to the stopping member are each a pressing force to the shaft of the stopping member. Meanwhile, in this embodiment, the forces that the projecting portions of the pair of planetary gear units apply to the stopping member are each a tensile force to the shaft of the stopping member.

FIG. 12 is a view of an engaged state of a first engaging portion 46A and a first projecting portion 45A of a stopping member 46. Note that, the first projecting portion 45A and a second projecting portion 45B are rotated respectively in directions indicated by the arrows Y1 and Y2. A vector of the force F4 that the stopping member 46 receives from a contact point between the first engaging portion 46A and the first projecting portion 45A extends in a direction indicated by the straight solid-line arrow in FIG. 12. In this embodiment, a pivot fulcrum 47 of the stopping member 46 is formed on an extension line in a negative direction of the force F4. At the same time, although an engaged state is not illustrated, a vector in the direction of the force F5 that the stopping member 46 similarly receives from a contact point between the second engaging portion 46B and the second projecting portion 45B at the time when the stopping member 46 is engaged extends in a direction indicated by the broken-line arrow in FIG. 12.

When viewed in a direction of a pivot axis of the stopping member 46, the pivot fulcrum 47 of the stopping member 46 is arranged in the following region. Specifically, with respect to a plane extended from a contact surface between the first projecting portion 45A and the first engaging portion 46A, the pivot fulcrum 47 of the stopping member 46 is arranged in a region on a side opposite to an extending direction of the vector of the force F4. In addition, with respect to a plane extended from a contact surface between the second projecting portion 45B and the second engaging portion 46B, the pivot fulcrum 47 of the stopping member 46 is arranged in a region on a side opposite to an extending direction of the vector of the force F5. More specifically, in this embodiment, the pivot fulcrum 47 of the stopping member 46 is formed at an intersection between the extension line that extends in the direction opposite to the extending direction of the vector of the force F4 from the contact point between the first engaging portion 46A and the first projecting portion 45A, and the extension line that extends in the direction opposite to the extending direction of the vector of the force F5 from the contact point between the second engaging portion 46B and the second projecting portion 45B. With this, all the tensile force that the stopping member 46 receives from the projecting portions 45 under the engaged state is applied to the pivot fulcrum 47 of the stopping member 46. As a result, reliable engagement can be performed without applying load on the solenoid 31 at the time of the engagement or switching (disengagement).

Note that, the pivot fulcrum 47 of the stopping member 46 need not necessarily be arranged on the extension lines in the directions opposite to the vectors of the force F4 and the force F5 as long as the pivot fulcrum 47 falls within a region on negative sides in normal directions of surfaces of the projecting portions at the engaging portions. With this, the stopping member 46 and the pivot fulcrum 47 receive tensile forces from the two projecting portions. In this way, an object to form the two planetary gear units into the same shape can be achieved.

For example, in a case where such a shape is set that a force is applied in a biting direction at the time when the stopping member 46 is engaged, the stopping member can be more firmly engaged. In a case where such a shape is set that a force is applied in the disengaging direction, the stopping member can be switched with a lower torque.

Note that, as in the first embodiment, the solenoid 31 is energized to cause the reverse conveyance roller pair to be rotated forward, and is de-energized to cause the reverse conveyance roller pair to be rotated reversely to the forward direction. There are no particular operational problems even when the logic of the energization and de-energization of the solenoid 31 is reversed to that described in this embodiment. However, in consideration of electric power consumption and an increase in temperature in the image forming apparatus, when the logic described in this embodiment is selected, the energization of the actuator need not be performed until the start of the reverse rotation after the sheet is fed into the reverse conveyance path. In this way, an energized time period can be shortened relative to a non-energized time period. In view of this, the logic described in this embodiment is suited.

As described above, according to the second embodiment, the negative forces to be applied from the projecting portions of each of the first planetary gear unit and the second planetary gear unit at the time of engagement are generated toward a vicinity of the pivot shaft of the stopping member. Thus, external forces need substantially not be applied to maintain the engagement, and a load is not substantially applied to the solenoid at the time of engagement. As a result, reliable engagement can be performed. In this way, not only the shapes of the first planetary gear unit and the second planetary gear unit but also the shapes of the projecting portions thereof can be each formed into the same shapes, and hence the pair of planetary gear units are mountable compatibly with each other at the time of apparatus assembly. As a result, a risk of a mistake in assembly can be eliminated. In addition, for the reason described above, assembly work efficiency can be increased, and costs for management and manufacture of components can be suppressed. Further, this configuration according to the second embodiment is advantageous in downsizing.

Note that, although a printer is exemplified as the image forming apparatus in the embodiments described above, the present invention is not limited thereto. For example, the present invention is applicable also to other image forming apparatus such as a copying machine, a facsimile machine, and a multifunction peripheral having functions of those machines in combination. When the present invention is applied to drive mechanisms of those image forming apparatus or drive mechanisms of conveyance units, the same effects can be obtained.

Further, although a conveyance unit including a conveyance section configured to convey sheets such as recording paper as recording objects in one direction or another direction is exemplified in the embodiments described above, the present invention is not limited thereto. For example, also when the present invention is applied to a conveyance unit including a conveyance section configured to convey sheets such as originals as reading objects in one direction or another direction, the same effects can be obtained.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-088231, filed Apr. 22, 2014 and Japanese Patent Application No. 2015-077792, filed Apr. 6, 2015 which are hereby incorporated by reference herein in their entirety.

What is claimed is:

1. A driving force transmission apparatus, comprising:

a first planetary gear unit including a first engaged gear having a first engaged portion, and a first meshing gear;

a second planetary gear unit including a second engaged gear having a second engaged portion, and a second meshing gear configured to mesh with the first meshing gear; and a stopping member, including a first engaging portion engageable with the first engaged portion, and a second engaging portion engageable with the second engaged portion, the stopping member being pivotally movable to a first stop position, at which the first engaging portion is engaged with the first engaged portion so that the first engaged gear is stopped, and to a second stop position, at which the second engaging portion is engaged with the second engaged portion so that the second engaged gear is stopped, wherein the first engaged gear and the second engaged gear have the same cross-sectional shape when viewed in a direction of a pivot axis of the stopping member, wherein a pivot fulcrum of the stopping member is arranged at an intersection between an extension line of a vector of a force that the first engaging portion receives from the first engaged portion under a state in which the stopping member is at the first stop position, and an extension line of a vector of a force that the second engaging portion receives from the second engaged portion under a state in which the stopping member is at the second stop position, and wherein, when the first engaged gear and the second engaged gear are viewed in the direction of the pivot axis of the stopping member, (1) a first line passing through a rotation axis of the first engaged gear and a rotation axis of the second engaged gear, (2) a second line passing through the first engaged portion and the second engaged portion, and (3) a third line, parallel to the first line and to the second line and passing through the pivot axis of the stopping member, are positioned, in this order, in a direction perpendicular to the first line.

2. A driving force transmission apparatus according to claim 1, wherein a rotation direction of the first engaged gear in the state in which the stopping member is at the second stop position and a rotation direction of the second engaged gear in the state in which the stopping member is at the first stop position are reverse to each other.

3. A driving force transmission apparatus according to claim 1, wherein the first engaged gear and the second engaged gear each comprise claw portions engageable with the stopping member, and wherein each of the claw portions is formed into a symmetrical shape with respect to a straight line passing through the rotation axis of the corresponding one of the first engaged gear and the second engaged gear and a distal end of the corresponding claw portion.

4. A driving force transmission apparatus according to claim 1, further comprising:

an actuator configured to cause the stopping member to be moved between the first stop position and the second stop position; and an urging member configured to urge the stopping member toward the first stop position, wherein the actuator is energized to cause the stopping member to be moved to the second stop position against an urging force of the urging member.

5. A driving force transmission apparatus according to claim 1, further comprising a driven gear, wherein the first engaged gear includes a sun gear of the first planetary gear unit, and the second engaged gear includes a sun gear of the second planetary gear unit, wherein the first planetary gear unit includes:

first planetary gears configured to mesh with the first engaged gear, a first carrier configured to support the first planetary gears so as to revolve about the first engaged gear, the first carrier comprising a first input gear portion formed along an outer periphery of the first carrier, and a first internal gear including:

a first internal gear portion configured to mesh with the first planetary gears, and a first output gear portion configured to mesh with the driven gear, wherein the second planetary gear unit includes:

second planetary gears configured to mesh with the second engaged gear, a second carrier configured to support the second planetary gears so as to revolve about the second engaged gear, the second carrier comprising a second input gear portion formed along an outer periphery of the second carrier, and a second internal gear including:

a second internal gear portion configured to mesh with the second planetary gears, and a second output gear portion configured to mesh with the driven gear, wherein a driving force from a drive source is input to the first input gear portion so that the first input gear portion and the second input gear portion mesh with each other, wherein when the stopping member is engaged with the first engaged portion, the driven gear is rotated in a first direction with a rotational force of the first output gear portion, and wherein when the stopping member is engaged with the second engaged portion, the driven gear is rotated in a second direction reverse to the first direction with a rotational force of the second output gear portion.

6. A driving force transmission apparatus, comprising:

a first planetary gear unit including a first engaged gear having a first engaged portion, and a first meshing gear;

a second planetary gear unit including a second engaged gear having a second engaged portion, and a second meshing gear configured to mesh with the first meshing gear; and a stopping member including a first engaging portion engageable with the first engaged portion, and a second engaging portion engageable with the second engaged portion, the stopping member being movable, by pivoting, to a first stop position, at which the first engaging portion is engaged with the first engaged portion so that the first engaged gear is stopped, and to a second stop position, at which the second engaging portion is engaged with the second engaged portion so that the second engaged gear is stopped, wherein the first engaged gear and the second engaged gear have the same cross-sectional shape when viewed in a direction of a pivot axis of the stopping member, wherein a pivot fulcrum of the stopping member is arranged at an intersection between an extension line of a vector in a direction opposite to a vector of a force that the first engaging portion receives from the first engaged portion under a state in which the stopping member is at the first stop position, and an extension line of a vector in a direction opposite to a vector of a force that the second engaging portion receives from the second engaged portion under a state in which the stopping member is at the second stop position, and wherein, when the first engaged gear and the second engaged gear are viewed in the direction of the pivot axis of the stopping member, (1) a first line passing through a rotation axis of the first engaged gear and a rotation axis of the second engaged gear, (2) a second line passing through the first engaged portion and the second engaged portion, and (3) a third line, parallel to the first line and to the second line and passing through the pivot axis of the stopping member, are positioned, in this order, in a direction perpendicular to the first line.

7. A driving force transmission apparatus according to claim 6, wherein a rotation direction of the first engaged gear in the state in which the stopping member is at the second stop position and a rotation direction of the second engaged gear in the state in which the stopping member is at the first stop position are reverse to each other.

8. A driving force transmission apparatus according to claim 6, wherein the first engaged gear and the second engaged gear each comprise claw portions engageable with the stopping member, and wherein each of the claw portions is formed into a symmetrical shape with respect to a straight line passing through the rotation axis of the corresponding one of the first engaged gear and the second engaged gear and a distal end of the corresponding claw portion.

9. A driving force transmission apparatus according to claim 6, further comprising:

an actuator configured to cause the stopping member to be moved between the first stop position and the second stop position;

an urging member configured to urge the stopping member toward the first stop position, wherein the actuator is energized to cause the stopping member to be moved to the second stop position against an urging force of the urging member.

10. A driving force transmission apparatus according to claim 6, further comprising a driven gear, wherein the first engaged gear comprises a sun gear of the first planetary gear unit, wherein the second engaged gear comprises a sun gear of the second planetary gear unit, wherein the first planetary gear unit comprises:

first planetary gears configured to mesh with the first engaged gear;

a first carrier configured to support the first planetary gears so as to revolve about the first engaged gear, the first carrier comprising a first input gear portion formed along an outer periphery of the first carrier, and a first internal gear comprising:

a first internal gear portion configured to mesh with the first planetary gears, and a first output gear portion configured to mesh with the driven gear, wherein the second planetary gear unit comprises:

second planetary gears configured to mesh with the second engaged gear, a second carrier configured to support the second planetary gears so as to revolve about the second engaged gear, the second carrier comprising a second input gear portion formed along an outer periphery of the second carrier, and a second internal gear comprising:

a second internal gear portion configured to mesh with the second planetary gears, and a second output gear portion configured to mesh with the driven gear, wherein a driving force from a drive source is input to the first input gear portion so that the first input gear portion and the second input gear portion mesh with each other, wherein, when the stopping member is engaged with the first engaged portion, the driven gear is rotated in a first direction with a rotational force of the first output gear portion, and wherein, when the stopping member is engaged with the second engaged portion, the driven gear is rotated in a second direction reverse to the first direction with a rotational force of the second output gear portion.

11. A driving force transmission apparatus, comprising:

a first planetary gear unit including:

a first engaged gear having a first engaged portion, and a first meshing gear;

a second planetary gear unit including:

a second engaged gear having a second engaged portion, and a second meshing gear configured to mesh with the first meshing gear; and a stopping member including:

a first engaging portion engageable with the first engaged portion, and a second engaging portion engageable with the second engaged portion, the stopping member being movable, by pivoting, to a first stop position, at which the first engaging portion is engaged with the first engaged portion so that the first engaged gear is stopped, and to a second stop position, at which the second engaging portion is engaged with the second engaged portion so that the second engaged gear is stopped, wherein a rotation direction of the first engaged gear under a state in which the stopping member is at the second stop position and a rotation direction of the second engaged gear under a state in which the stopping member is at the first stop position are reverse to each other, wherein the first engaged gear and the second engaged gear have the same cross-sectional shape when viewed in a direction of a pivot axis of the stopping member, and wherein, when the first engaged gear and the second engaged gear are viewed in the direction of the pivot axis of the stopping member, (1) a first line passing through a rotation axis of the first engaged gear and a rotation axis of the second engaged gear, (2) a second line passing through the first engaged portion and the second engaged portion, and (3) a third line, parallel to the first line and to the second line and passing through the pivot axis of the stopping member, are positioned, in this order, in a direction perpendicular to the first line.

12. A driving force transmission apparatus according to claim 11, wherein the first engaged gear and the second engaged gear each comprise claw portions engageable with the stopping member, and wherein each of the claw portions is formed into a symmetrical shape with respect to a straight line passing through the rotation axis of corresponding one of the first engaged gear and the second engaged gear and a distal end of the corresponding claw portion.

13. A driving force transmission apparatus according to claim 11, further comprising:

an actuator configured to cause the stopping member to be moved between the first stop position and the second stop position;

an urging member configured to urge the stopping member toward the first stop position, wherein the actuator is energized to cause the stopping member to be moved to the second stop position against an urging force of the urging member.

14. A driving force transmission apparatus according to claim 11, further comprising a driven gear, wherein the first engaged gear comprises a sun gear of the first planetary gear unit, wherein the second engaged gear comprises a sun gear of the second planetary gear unit, wherein the first planetary gear unit comprises:

first planetary gears configured to mesh with the first engaged gear, a first carrier configured to support the first planetary gears so as to revolve about the first engaged gear, the first carrier comprising a first input gear portion formed along an outer periphery of the first carrier, and a first internal gear comprising:

a first internal gear portion configured to mesh with the first planetary gears, and a first output gear portion configured to mesh with the driven gear, wherein the second planetary gear unit comprises:

second planetary gears configured to mesh with the second engaged gear, a second carrier configured to support the second planetary gears so as to revolve about the second engaged gear, the second carrier comprising a second input gear portion formed along an outer periphery of the second carrier, and a second internal gear comprising:

a second internal gear portion configured to mesh with the second planetary gears, and a second output gear portion configured to mesh with the driven gear, wherein a driving force from a drive source is input to the first input gear portion so that the first input gear portion and the second input gear portion mesh with each other, wherein, when the stopping member is engaged with the first engaged portion, the driven gear is rotated in a first direction with a rotational force of the first output gear portion, and wherein, when the stopping member is engaged with the second engaged portion, the driven gear is rotated in a second direction reverse to the first direction with a rotational force of the second output gear portion.

15. A driving force transmission apparatus according to claim 11, wherein a pivot fulcrum of the stopping member is arranged in one of:

a region defined between a side on which a vector of a force that the first engaged portion receives from the first engaging portion extends with respect to a plane extended from a contact surface between the first engaged portion and the first engaging portion, and a side on which a vector of a force that the second engaged portion receives from the second engaging portion extends with respect to a plane extended from a contact surface between the second engaged portion and the second engaging portion, and a region defined between a side opposite to a direction in which the vector of the force that the first engaged portion receives from the first engaging portion extends with respect to the plane extended from the contact surface between the first engaged portion and the first engaging portion, and a side opposite to a direction in which the vector of the force that the second engaged portion receives from the second engaging portion extends with respect to the plane extended from the contact surface between the second engaged portion and the second engaging portion.

16. A conveyance apparatus, comprising:

a conveyance member configured to be rotated in one of a forward direction and a reverse direction so as to convey a sheet in one of one direction and another direction; and a driving force transmission apparatus configured to transmit a driving force from a drive source to the conveyance member so as to rotate the conveyance member in the one of the forward direction and the reverse direction, the driving force transmission apparatus comprising:

a first planetary gear unit comprising:

a first engaged gear having a first engaged portion; and a first meshing gear;

a second planetary gear unit comprising:

a second engaged gear having a second engaged portion; and a second meshing gear configured to mesh with the first meshing gear; and a stopping member comprising:

a first engaging portion engageable with the first engaged portion; and a second engaging portion engageable with the second engaged portion, the stopping member being pivotally movable to a first stop position, at which the first engaging portion is engaged with the first engaged portion so that the first engaged gear is stopped, and to a second stop position, at which the second engaging portion is engaged with the second engaged portion so that the second engaged gear is stopped, wherein the first engaged gear and the second engaged gear have the same cross-sectional shape when viewed in a direction of a pivot axis of the stopping member, wherein a pivot fulcrum of the stopping member is arranged at an intersection between an extension line of a vector of a force that the first engaging portion receives from the first engaged portion under a state in which the stopping member is at the first stop position, and an extension line of a vector of a force that the second engaging portion receives from the second engaged portion under a state in which the stopping member is at the second stop position, and wherein, when the first engaged gear and the second engaged gear are viewed in the direction of the pivot axis of the stopping member, (1) a first line passing through a rotation axis of the first engaged gear and a rotation axis of the second engaged gear, (2) a second line passing through the first engaged portion and the second engaged portion, and (3) a third line, parallel to the first line and to the second line and passing through the pivot axis of the stopping member, are positioned, in this order, in a direction perpendicular to the first line.

17. A conveyance apparatus, comprising:

a conveyance member configured to be rotated in one of a forward direction and a reverse direction so as to convey a sheet in one of one direction and another direction; and a driving force transmission apparatus configured to transmit a driving force from a drive source to the conveyance member so as to rotate the conveyance member in the one of the forward direction and the reverse direction, the driving force transmission apparatus comprising:

a first planetary gear unit comprising:

a first engaged gear having a first engaged portion; and a first meshing gear;

a second planetary gear unit comprising:

a second engaged gear having a second engaged portion; and a second meshing gear configured to mesh with the first meshing gear; and a stopping member comprising:

a first engaging portion engageable with the first engaged portion; and a second engaging portion engageable with the second engaged portion, the stopping member being movable, by pivoting, to a first stop position, at which the first engaging portion is engaged with the first engaged portion so that the first engaged gear is stopped, and to a second stop position, at which the second engaging portion is engaged with the second engaged portion so that the second engaged gear is stopped, wherein the first engaged gear and the second engaged gear have the same cross-sectional shape when viewed in a direction of a pivot axis of the stopping member, wherein a pivot fulcrum of the stopping member is arranged at an intersection between an extension line of a vector in a direction opposite to a vector of a force that the first engaging portion receives from the first engaged portion under a state in which the stopping member is at the first stop position, and an extension line of a vector in a direction opposite to a vector of a force that the second engaging portion receives from the second engaged portion under a state in which the stopping member is at the second stop position, and wherein, when the first engaged gear and the second engaged gear are viewed in the direction of the pivot axis of the stopping member, (1) a first line passing through a rotation axis of the first engaged gear and a rotation axis of the second engaged gear, (2) a second line passing through the first engaged portion and the second engaged portion, and (3) a third line, parallel to the first line and to the second line and passing through the pivot axis of the stopping member, are positioned, in this order, in a direction perpendicular to the first line.

18. A conveyance apparatus, comprising:

a conveyance member configured to be rotated in one of a forward direction and a reverse direction so as to convey a sheet in one of one direction and another direction; and a driving force transmission apparatus configured to transmit a driving force from a drive source to the conveyance member so as to rotate the conveyance member in the one of the forward direction and the reverse direction, the driving force transmission apparatus comprising:

a first planetary gear unit comprising:

a first engaged gear having a first engaged portion, and a first meshing gear;

a second planetary gear unit comprising:

a second engaged gear having a second engaged portion, and a second meshing gear configured to mesh with the first meshing gear; and a stopping member comprising:

a first engaging portion engageable with the first engaged portion, and a second engaging portion engageable with the second engaged portion, the stopping member being movable, by pivoting, to a first stop position at which the first engaging portion is engaged with the first engaged portion so that the first engaged gear is stopped, and to a second stop position at which the second engaging portion is engaged with the second engaged portion so that the second engaged gear is stopped, wherein a rotation direction of the first engaged gear under a state in which the stopping member is at the second stop position and a rotation direction of the second engaged gear under a state in which the stopping member is at the first stop position are reverse to each other, wherein the first engaged gear and the second engaged gear have the same cross-sectional shape when viewed in a direction of a pivot axis of the stopping member, and wherein, when the first engaged gear and the second engaged gear are viewed in the direction of the pivot axis of the stopping member, (1) a first line passing through a rotation axis of the first engaged gear and a rotation axis of the second engaged gear, (2) a second line passing through the first engaged portion and the second engaged portion, and (3) a third line, parallel to the first line and to the second line and passing through the pivot axis of the stopping member, are positioned, in this order, in a direction perpendicular to the first line.

* * * * *